(12) United States Patent
Konda et al.

(10) Patent No.: US 11,711,399 B2
(45) Date of Patent: Jul. 25, 2023

(54) POLICY ENFORCEMENT FOR SECURE DOMAIN NAME SERVICES

(71) Applicant: McAfee, LLC, San Jose, CA (US)

(72) Inventors: Tirumaleswar Reddy Konda, Bangalore (IN); Shashank Jain, Bangalore (IN); Piyush Pramod Joshi, Aurangabad (IN); Himanshu Srivastava, Bangalore (IN)

(73) Assignee: McAfee, LLC, San Jose, CA (US)

( * ) Notice: Subject to any disclaimer, the term of this patent is extended or adjusted under 35 U.S.C. 154(b) by 227 days.

(21) Appl. No.: 17/157,751

(22) Filed: Jan. 25, 2021

(65) Prior Publication Data

US 2022/0239696 A1 Jul. 28, 2022

(51) Int. Cl.
*H04L 9/40* (2022.01)
*H04L 61/4511* (2022.01)

(52) U.S. Cl.
CPC .......... *H04L 63/20* (2013.01); *H04L 61/4511* (2022.05); *H04L 63/0236* (2013.01); *H04L 63/0485* (2013.01)

(58) Field of Classification Search
CPC . H04L 63/20; H04L 63/0236; H04L 63/0485; H04L 61/4511
USPC ............................................................ 726/1
See application file for complete search history.

(56) References Cited

U.S. PATENT DOCUMENTS 7,296,155 B1\* 11/2007 Trostle ................ H04L 63/1441
713/170
2018/0131665 A1\* 5/2018 Joffe ................... H04L 61/4511

OTHER PUBLICATIONS

Armer, Jonathan, "PsiXBot InfoStealer Uses DNS over HTTPS," Infoblox, Next Level Networking, Apr. 2020, 2 pages.
Boucadair, M., et al., "DHCP and Router Advertisement Options for Encrypted DNS Discovery," Internet Draft draft-btw-add-home-12, Jan. 22, 2021; 33 pages.
Strata by Palo Alto Networks, "Protecting Organizations in a World of DoH and DoT," Jul. 2020; 4 pages.
Turing, Alex, et al., "An Analysis of Godlua Backdoor," Botnet-360 Netlab Blog, Network Security Research Lab at 360, Jul. 1, 2019; 20 pages.

\* cited by examiner

*Primary Examiner* — Michael S McNally
(74) *Attorney, Agent, or Firm* — Patent Capital Group

(57) ABSTRACT

There is disclosed in one example a gateway apparatus, including: a hardware platform including a processor and a memory; and instructions stored within the memory to instruct the processor to: provide a domain name system (DNS) server, the DNS server to provide an encrypted DNS service, and to cache resolved domain names; receive an outgoing network packet; determine a destination address of the outgoing network packet; and upon determining that the destination address was not cached, apply a security policy.

20 Claims, 12 Drawing Sheets

POLICY ENFORCEMENT FOR SECURE DOMAIN NAME SERVICES

FIELD OF THE SPECIFICATION

This application relates in general to computer security, and more particularly, though not exclusively, to providing a system and method of policy enforcement for secure domain name services.

BACKGROUND

It is common for an enterprise gateway, including a family or home gateway, to provide a domain name system (DNS) server.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
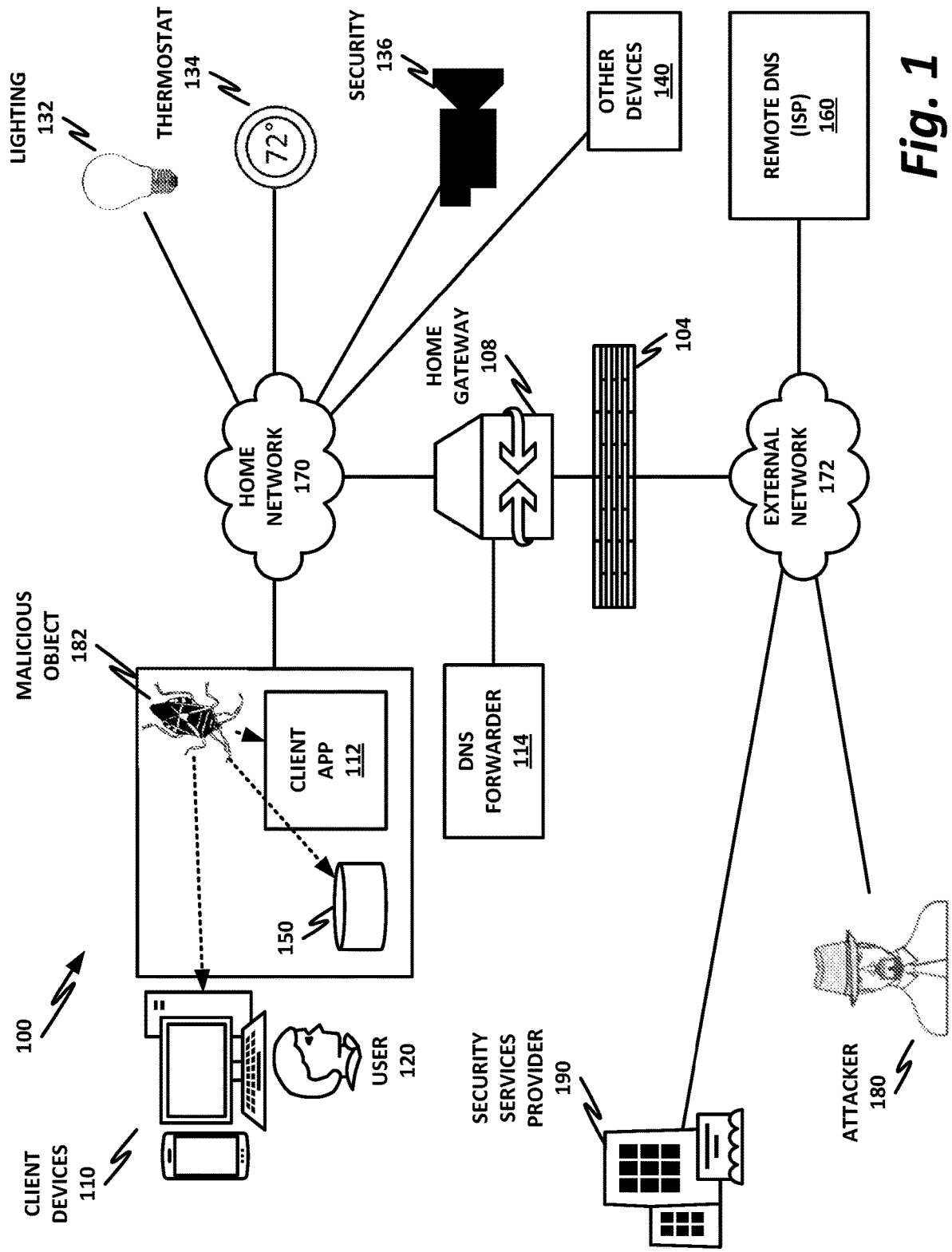
FIG. 1 is a block diagram of selected elements of a security ecosystem.

In an example, there is disclosed a gateway apparatus, comprising: a hardware platform comprising a processor and a memory; and instructions stored within the memory to instruct the processor to: provide a domain name system (DNS) server, the DNS server to provide an encrypted DNS service, and to cache resolved domain names; receive an outgoing network packet; determine a destination address of the outgoing network packet; and upon determining that the destination address was not cached, apply a security policy.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Domain name system (DNS) resolution is a long-standing and integral part of internet architecture. In a traditional DNS query, the client device sends a DNS resolution request to a DNS server, with a domain name or subdomain that the client device needs to reach. The DNS server then returns the internet protocol (IP) address of the given domain name by querying a large local resolver table, or by forwarding the request to another DNS server.

Traditionally, DNS exchanges are provided in clear text. This leads DNS resolution requests to being vulnerable to attacks like sniffing, poisoning, interception, man-in-the-middle, and similar. This also leaves potentially sensitive user information vulnerable, as an attacker may be able to view which domain names the client is visiting. This lack of security in traditional DNS provides a vehicle for attackers to perform malicious acts like phishing, malware delivery, reflection attacks, and similar.

Because of these challenges with traditional unencrypted DNS exchanges, the internet community is moving toward a new encrypted DNS standard such as DNS over transport layer security (DoT) and DNS over hypertext transfer protocol secure (DoH). Indeed, a majority of public DNS resolvers such as Google, Quad9, Cloudflare, and similar, as well as many internet service providers (ISPs) already support DoT and DoH.

Beneficially, standards like DoT and DoH have secured DNS messages. However, this has also introduced other security challenges and has provided new vectors of attack. For example, sophisticated modern malware may actually use DoH to circumvent DNS-based security services provided by many enterprises or home security systems. Popular examples include Godlua and PsiXBot InfoStealer. Because these malware packages use DoH, the only way for middle boxes to differentiate between benign hypertext transfer protocol secure (HTTPS) traffic and DoH from a malware is to act as a transport layer secure (TLS) proxy.

However, it is not always feasible to deploy a TLS proxy in both enterprise and consumer deployments. For example, one existing solution is to install root certificates on all user devices. These root certificates allow the DNS queries to be decrypted by the enterprise gateway, and thus traditional domain name-based security services can be provided by the enterprise. However, many internet of things (IoT) devices do not support such root certificates, because they may have very barebones operating systems, and thus have limited capabilities. Furthermore, while a company-provided laptop or desktop computer may be easily provisioned with a root certificate, many ecosystems are evolving toward a heterogeneous or bring your own device (BYOD) architecture.

Enterprise-owned devices may have appropriate root certificates, but user-owned devices that may need to connect to the network may not have root certificates. Furthermore, users may not want to allow the enterprise to install root certificates on their personal devices, as this gives the enterprise access to all of their data, whether it be business or personal. While it is possible for the enterprise to simply restrict non-enterprise-owned devices from connecting to the network, in a modern heterogeneous environment, this may not be a practical solution. Thus, it is desirable to provide high-security DoH and DoT services via a home gateway, even in cases where it may not be possible to install a root certificate on every device.

In those cases, it may be desirable to restrict such devices from using their own DoH or DoT services or resolvers. For example, many modern browsers default to using their own DoH or DoT servers, such as Cloudflare. These actually bypass the network-configured DNS query services, and route all DNS queries to the application-specific service. However, malware can use a public DoH server or its own DoH resolver to resolve malicious websites, command-and-control services, and similar. In some cases, network security services deployed on customer premises equipment (CPE) or on an ISP are not able to detect and block DoH sessions. In enterprise networks, BYOD architectures (particularly, those without mobile device management) may also have a public DoH server configured, or have a malware connecting to a public DoH resolver or its own DoH resolver. Enterprise network security solutions are unable to identify or block those communications without acting as a TLS proxy.

In cases where configuring root certificates is not an option, security vendors may rely on blocking connections to public DoH servers. Blocking DoH traffic to public domain servers and allowing only network-provided DoH servers is also not always a viable solution. For example, it can be very challenging to differentiate between genuine HTTPS and DoH sessions, unless the gateway is acting as a TLS proxy. With the advent of TLS version 1.3 (along with encrypted structure of management information), it is even more challenging to identify whether the connection is, in fact, to a DoH server. Furthermore, targeted blocking of known DoH server domains is also not feasible, because new DoH servers appear frequently. This can create a situation where there is an arms race between the enterprise trying to block known DoH server domains, and new DoH server domains being discovered.

Targeted blocking of IP addresses may also not be feasible in every case. For example, an IP address may be shared with multiple services. Thus, blocking an IP address may block a DoH server at that address, but it may also block other available services. For example, if an IP address resolves to www.google.com, blocking access to that IP address may block both DoH services and search services.

There are also other techniques via which malware or malicious entities can resolve their domains and get IP addresses. For example, in one type of attack, a malicious actor uses a search engine such as Google to get an IP address for a malicious domain. A simple example can be where a malware creates a TLS connection to search.google.com (i.e., the Google search engine). The address search.google.com is very popular and is an allow-listed domain, and thus is allowed through. The malware then tries to resolve a bad reputation website, such as maliciousactivity.com, through the search engine. The malware sends a GET request to a search.google.com endpoint called "experimentaldns" as:

GET/experimentaldns?dns=maliciousactivity.com HTTP1.1

This HTTP request is forwarded to Google's DoH server by the Google search engine, and the resulting IP address of maliciousactivity.com is sent back as an HTTP response. Thus, the malware may resolve the domain without creating a connection with the public DoH server.

Advantageously, policies can be crafted to take advantage of DoH or DoT via a middle box such as Secure Home Platform (SHP) by MCAFEE, LLC, or some other similar technology provided by another vendor. Such middle boxes may adopt DoH by deploying a DoH/DoT server capable of filtering domains using traditional domain filtering security services. Indeed, there are several draft standards that enable the discovery of locally deployed DoH/DoT servers, and cryptographically attesting to the identity of the organization hosting the DoH or DoT server. These include draft standards for DNS discovery and deployment consideration for home networks and DNS server selection.

To identify and stop malware or malicious entities from bypassing on-path filtering and security services by using a public DoH server, policies may be provided as a novel mechanism for detecting and blocking the use of unauthorized public DoH servers, without acting as a TLS proxy.

This is based on a DoH/DoT capable DNS server being deployed in the middle box. The present specification provides an example of such a secure middle box that provides a DoH/DoT-capable DNS server. In the present example, the middle box also provides and enforces novel security policies. For example, the middle box may first identify whether the endpoint supports DoH, and whether it supports an autodiscovery mechanism, such as the autodiscovery mechanisms currently being proposed as standards. If the endpoint supports both DoH and autodiscovery, then for any flow, if the destination IP address was not resolved using the local server, that flow may be considered as malicious. The flow may then be blocked. In the case of an endpoint that supports DoH but does not support or enable an autodiscovery mechanism, a captive portal may be provided and shown to ask the user to explicitly configure the local DoH server on the endpoint.

This can also be applicable to an enterprise configuration for BYOD. If the BYOD device supports DoH discovery, the enterprise can configure its local DoH resolver on the BYOD device. Once configured, the enterprise gateway can start filtering domain names on enterprise policies, and any flow that was not resolved using the enterprise DoH server is dropped.

For devices that do not support DoH services, the policy may require them to still use the local gateway as their DNS server. Again, a captive portal could be used to request the user to configure the device to use the local gateway as the DNS server. In that case, although the DNS requests are sent via plain-text, the DoH/DoT capable forwarding server is still capable of handling those requests. Thus, it is ensured that the DNS services are still applied.

Commonly, enterprises may provide a gateway to act as an access point between the enterprise and the internet, at large. As used in this specification, an enterprise may include a business, government, or other enterprise, and may also include a family or home routing system.

The enterprise or home gateway may provide a caching DNS server or a DNS forwarder. These can increase the speed of DNS queries for domain names that have recently been accessed. Commonly, a DNS cache may have a time to live (TTL), after which the DNS query may need to be refreshed. This provides enhanced speed, because internet users commonly access a relatively limited number of domain names over and over again. Because these queries do not need to go to the outside DNS server, they can be serviced much more quickly. After the TTL expires (e.g., after a timeout period such as 24 hours), the cached DNS entry is purged, and the next query may go out to the original DNS server. However, once again, it is common for users to access the same domain name multiple times. Thus, these queries may hit the DNS cache until the next timeout.

Another benefit of a caching DNS server on the local enterprise gateway is that it can be used to provide privacy, security, and policy enforcement for the enterprise. For example, the use of a caching DNS server limits the ability of the outside DNS server to know how often a particular domain name is accessed by enterprise users. Because the caching DNS server requests the IP address for the domain name only once per TTL, the outside DNS server does not know how many more times the domain name is accessed during that TTL. The DNS server may employ workarounds to this issue, such as by providing a shortened TTL.

In a network, both internal and external DNS-based attacks can happen. Additionally, pervasive monitoring and modification of DNS messages within an enterprise network is also possible. Thus, the use of privacy and security enabling DNS servers ensures that the DNS communications are secure end-to-end.

This feature can also be used for DNS filtering. For example, a family or a nonfamily enterprise may maintain categories of domain names that are blocked, or otherwise restricted. For example, a family may choose to restrict access to pornography, advocacy for illegal or dangerous activity, or other content that is contrary to the family's values. A business or government enterprise may choose to categorize domain names into multiple categories. For example, domain names that are directly related to the enterprise's business operations may be unrestricted. Another category of domain names may include domains that are not restricted, but that are not directly related to the business or government function. These may require, for example, user verification and/or may be subject to special logging. Other domain names may be blocked outright by the enterprise.

Thus, domain name caching and forwarding may be used within an enterprise, including within a family, to provide parental and access controls, block malicious domains, or provide other features.

One difficulty with such DNS caching is newer DNS protocols that use encryption. For example, if an endpoint is configured to use internet-hosted or public DNS over transport layer security (DoT), or DNS over hypertext transfer protocol secure (DoH) servers, local DNS servers cannot service the encrypted DNS requests. Thus, the local caching DNS server may be prevented from providing services to local endpoints, and may not be able to enforce DNS filtering.

In some cases, browser platforms such as Firefox and operating systems like Android come preconfigured to use internet services hosted via public DoH and DoT servers. These evolving standards can help to address users' privacy concerns and provide security to a certain extent, but they may frustrate the enterprise or family's ability to provide legitimate controls over the use of its network.

Evolving DNS standards such as DoH and DoT also have major implications on security solutions. For example, MCAFEE, LLC provides Secure Home Platform (SHP), which is a home security service that provides, among other things, DNS forwarding and DNS caching with domain name filtering. However, if DNS traffic is encrypted, SHP and other home or enterprise security systems that are co-located on the home or enterprise cannot act on DNS requests from the endpoint and enforce their DNS filtering.

Furthermore, if the endpoint is an IoT device that is configured to use public DoT or DoH services, SHP or similar security platforms cannot enforce, for example, manufacturer usage description (MUD) rules that only allow intended communications to and from the IoT device.

In other words, an enterprise gateway or home security module such as SHP may not be able to enforce the network access control list (ACL) rules based on domain names that it is configured to accept.

Some effective solutions to providing additional services such as security and access control in a DoH or DoT infrastructure can be realized by partnering with an ISP or a plurality of ISPs. If the ISPs are willing to adopt or adapt to new standards, then a client software on the consumer endpoint can be provided with a DoH or DoT server on the ISP's DNS server. However, this is not always a practical solution. In some cases, ISPs may be unable or unwilling to adopt new standards that provide domain name-based services in a DoH or DoT context.

In cases where ISP cooperation is not available, then a home or enterprise gateway may be configured to provide a caching DNS server.

A traditional caching DNS server or DNS forwarder is often provided in home networks. Traditional DNS servers or DNS forwarders may provide benefits such as DNS filtering to block access to malicious domains, or to provide parental or enterprise controls. However, if the endpoint is configured to use internet-hosted or public DNS over datagram transport layer security (DTLS) or DNS over HTTPS servers, any available local DNS server may not be able to serve DNS requests from local endpoints, or enforce DNS filtering.

Some existing browser platforms such as Firefox and operating systems like Android may already be preconfigured to use internet-hosted or public DoH/DoT servers. These evolving standards provide user privacy and security from DNS snooping.

Thus, home gateways like SHP provided by MCAFEE, LLC or enterprise gateways may be blocked from providing their traditional security services in a DoH or DoT context. Furthermore, if the endpoint is an IoT device that is configured to use public DoT or DoH servers, a home gateway such as SHP or similar may be unable to enforce MUD rules to allow only intended communications to and from the IoT device. In other words, the home gateway or enterprise gateway may be unable to enforce network ACL rules based on domain names.

A current proposed standard defines a mechanism to securely bootstrap endpoint devices with the authentication domain name (ADN) and DNS server certificate of the local network's DoT/DoH server. This provides for a mechanism for endpoints in a home network to discover DoT/DoH servers hosted in the ISP cloud, integrated with home gateway filtering policies. These can be further integrated with a global database, such as Global Threat Intelligence (GTI™) provided by MCAFEE, LLC, to enforce DNS-based content filtering.

This mechanism is compatible with ISPs deploying DNS recursive servers with partners like Open-Xchange offering PowerDNS for DNS resolving services. The mechanism also works for ISPs willing to deploy a DoT/DoH server as a virtualized network function (VNF) with the appropriate functionality.

The remaining challenge, as discussed above, is that some ISPs may be unable or unwilling to use standards such as PowerDNS, and recursive DNS service providers may be unwilling to deploy these capabilities.

Furthermore, integration with every DNS recursive service provider is difficult and costly. Unless and until some of the extensions for DoH and DoT-based security services are adopted as a global standard used by almost every ISP, it cannot be assumed that ISPs will support these services.

Lacking global adoption by ISPs, a solution may be provided in which a DoT or DoH forwarder is provided on the home or enterprise router. In an illustrative method, a unique fully qualified domain name (FQDN) is assigned to each router, and provisioned with a domain validated certificate by a public certificate authority (CA) for the DoT/DoH forwarder hosted on the home or enterprise gateway or router. The DoT/DoH forwarder may then act like a public DoT/DoH server, but because it is available only on the local network, it is accessible only to endpoints within that network. This server may forward DNS requests to the ISP DNS recursive server. Furthermore, in at least some embodiments, there may be provisioned an IP-validated certificate by a public CA for the DoT/DoH forwarder hosted on the home router.

A DoT/DoH capable DNS forwarder of the present specification may be hosted on a home or enterprise gateway or router. This allows network security solutions, like SHP by MCAFEE, LLC or similar, to provide DNS-based filtering, parental controls, IoT firewall capabilities, and other security and privacy related functions on the router, while still preserving the user's privacy with respect to DNS lookups. The DNS forwarder on the home router also uses DoT/DoH, while forwarding DNS queries to the upstream recursive resolver, thereby providing DNS privacy equivalent to internet-hosted or public DoH/DoT servers.

There is also disclosed herein a mechanism for assigning a unique FQDN for each home router, which may be necessary in some cases to receive a certificate from a public CA for the DoT/DoH server. Furthermore, there is disclosed an alternative mechanism for using an IP-validated certificate for the DoT/DoH forwarder hosted on the home or enterprise router or gateway.

In an illustrative embodiment, an automated certificate management environment (ACME) is used to get and manage a domain validated certificate for an FQDN, or an IP-validated certificate for an IPv6 prefix assigned to the router. A cloud service may be used to perform ACME-based certificate issuance and management processes. This can help to reduce the load on the router. The certificate and key pairs, generated on the cloud service, can then be provided to the home routers using a secure communication channel.

This addresses the issue of endpoints using public DoT/DoH DNS-based network security capabilities on the home routers. In some existing embodiments, DoT and DoH are incompatible with services such as DNS-based filtering. As noted above, this is one of a plurality of solutions to this issue. In other solutions, where ISP DoT/DoH servers are securely provisioned into the endpoint, using a mechanism such as ADN, it may not always be necessary for the home gateway to provide its own public DoH/DoT server. However, as noted above, this solution assumes close cooperation between the ISP and the network security service provider, which is not always the case.

According to the teachings of the present specification, network security services may be provided to enforce device specific DNS-based filtering policies, while preserving the user's privacy. In another advantageous aspect, there is no necessary modification to the ISP's DNS server, which means lower integration costs with ISPs and DNS providers.

Note that the teachings of the specification do not preclude partnering with ISPs to host DoT/DoH capable DNS servers on the ISP's infrastructure. It is still possible to integrate DNS-based filtering and parental control policies. However, in the absence of universal ISP cooperation, or in cases where users or enterprises wish to maintain local control of those DNS services rather than ceding control to an ISP service, it may be beneficial to provide localized DoH/DoT services.

This mitigates the issue that each ISP may have its own DNS provider, such as PowerDNS, Berkeley Internet Name Domain (BIND), or similar. This plurality of DNS providers makes it difficult to integrate filtering and policy frameworks with each ISP. Furthermore, some ISPs are tied to DNS providers that are unwilling to cooperate with security service providers to provide DNS filtering services. For example, some of those DNS providers may provide their own DNS-based filtering and parental control capabilities, which means that in that space, they may act as direct competitors to the security service providers.

Furthermore, cloud-based DoT/DoH capable DNS servers may not be configured to resolve internal-only domain names (e.g., "internal.example.com") in enterprise networks, or ".local" and ".home.arpa" in home networks. In these cases, a split DNS tunnel is sometimes deployed where a local DNS server serves internal-only queries over plaintext. This makes internal-only DNS queries vulnerable to attack in the local network.

Thus, the DoH/DoT services provided on a home gateway, according to the teachings of the present specification, provide a solution that is operable without tight integration with ISP DNS servers. Furthermore, this solution provides DNS-based filtering and parental control functionality over DoT/DoH.

Embodiments of the present specification provide solutions that eliminate dependencies on the ISP and its DNS server by hosting a DoT/DoH capable DNS forwarder on the home router. The DoT/DoH capable DNS forwarder may require the router to have a public domain name, and a DNS server certificate signed by public CA. As discussed above, there are at least two available mechanisms to get and provision a public domain name and server certificate for home routers. These include providing a unique subdomain, and providing a public IP address assigned to the router.

The foregoing can be used to build or embody several example implementations, according to the teachings of the present specification. Some example implementations are disclosed below as nonlimiting illustrations of these teachings.

There is disclosed an example gateway apparatus, comprising: a hardware platform comprising a processor and a memory; and instructions stored within the memory to instruct the processor to: provide a domain name system (DNS) server, the DNS server to provide an encrypted DNS service, and to cache resolved domain names; receive an outgoing network packet; determine a destination address of the outgoing network packet; and upon determining that the destination address was not cached, apply a security policy.

There is further disclosed an example gateway apparatus, wherein the DNS server is a caching or forwarding server.

There is further disclosed an example gateway apparatus, wherein the DNS server is an authoritative server.

There is further disclosed an example gateway apparatus, wherein the DNS server is further to provide plain-text DNS services.

There is further disclosed an example gateway apparatus, wherein the instructions are further to provide an internet gateway service.

There is further disclosed an example gateway apparatus, wherein the instructions are further to provide a security agent to provide domain name-based security.

There is further disclosed an example gateway apparatus, wherein the instructions are further to purge cached queries after a time to live (TTL).

There is further disclosed an example gateway apparatus, wherein the instructions are to provide service or protocol exceptions to the security policy.

There is further disclosed an example gateway apparatus, wherein the instructions are further to characterize encrypted DNS capabilities of an endpoint source of the outgoing packet.

There is further disclosed an example gateway apparatus, wherein the security policy comprises blocking the outgoing packet if the endpoint has encrypted DNS and auto-configuration capabilities.

There is further disclosed an example gateway apparatus, wherein the security policy comprises providing a captive portal with configuration instructions if the endpoint has encrypted DNS capability but lacks auto-configuration capability.

There is further disclosed an example gateway apparatus, wherein the instructions are further to characterize encrypted DNS capabilities of an application source of the outgoing packet.

There is further disclosed an example gateway apparatus, wherein the security policy comprises blocking the outgoing packet if the application has encrypted DNS and auto-configuration capabilities.

There is further disclosed an example gateway apparatus, wherein the security policy comprises providing a captive portal with configuration instructions if the application has secure DNS capabilities but lacks auto-configuration capabilities.

There is also disclosed an example of one or more tangible, non-transitory computer-readable storage media having stored thereon executable instructions to: provision a domain name system (DNS) query cache; provide a secure DNS server, the secure DNS server to provide at least one of DNS over hypertext transfer protocol secure (DoH) or DNS over transport layer security (DoT), and to cache addresses of resolved domain names with a time to live (TTL); provide domain name-based security services; and apply a security policy to an outgoing packet after determining that a destination address of the outgoing packet is not in the DNS query cache.

There is further disclosed an example of one or more tangible, non-transitory computer-readable storage media, wherein the DNS query cache comprises a content-addressable memory (CAM) or ternary CAM (TCAM).

There is further disclosed an example of one or more tangible, non-transitory computer-readable storage media, wherein the secure DNS server is a caching or forwarding server.

There is further disclosed an example of one or more tangible, non-transitory computer-readable storage media, wherein the secure DNS server is an authoritative server.

There is further disclosed an example of one or more tangible, non-transitory computer-readable storage media, wherein the secure DNS server is further to provide plain-text DNS services.

There is further disclosed an example of one or more tangible, non-transitory computer-readable storage media, wherein the instructions are further to provide an internet gateway service.

There is further disclosed an example of one or more tangible, non-transitory computer-readable storage media, wherein the instructions are further to provide a security agent to provide domain name-based security.

There is further disclosed an example of one or more tangible, non-transitory computer-readable storage media, wherein the instructions are further to purge cached queries after a TTL.

There is further disclosed an example of one or more tangible, non-transitory computer-readable storage media, wherein the instructions are to provide service or protocol exceptions to the security policy.

There is further disclosed an example of one or more tangible, non-transitory computer-readable storage media, wherein the instructions are further to characterize encrypted DNS capabilities of an endpoint source of the outgoing packet.

There is further disclosed an example of one or more tangible, non-transitory computer-readable storage media, wherein the security policy comprises blocking the outgoing packet if the endpoint has encrypted DNS and auto-configuration capabilities.

There is further disclosed an example of one or more tangible, non-transitory computer-readable storage media, wherein the security policy comprises providing a captive portal with configuration instructions if the endpoint has encrypted DNS capability but lacks auto-configuration capability.

There is further disclosed an example of one or more tangible, non-transitory computer-readable storage media, wherein the instructions are further to characterize encrypted DNS capabilities of an application source of the outgoing packet.

There is further disclosed an example of one or more tangible, non-transitory computer-readable storage media, wherein the security policy comprises blocking the outgoing packet if the application has encrypted DNS and auto-configuration capabilities.

There is further disclosed an example of one or more tangible, non-transitory computer-readable storage media, wherein the security policy comprises providing a captive portal with configuration instructions if the application has secure DNS capabilities but lacks auto-configuration capabilities.

There is also disclosed an example computer-implemented method of providing domain name-based network security, comprising: receiving domain name system (DNS) queries, including DNS over hypertext transfer protocol secure (DoH) or DNS over transport layer security (DoT) queries; recursively resolving the queries; caching resolved addresses for the queries; receiving outbound network traffic; checking a destination of the outbound network traffic against the cached resolved addresses; and if the destination is not found in the cached resolved addresses, applying a security policy to the outbound traffic.

There is further disclosed an example method, wherein the method is implemented via a caching or forwarding DNS server.

There is further disclosed an example method, wherein the method is implemented via an authoritative DNS server.

There is further disclosed an example method, wherein the method is implemented via a DNS server configured to provide plain-text DNS services.

There is further disclosed an example method, further comprising providing instructions to a processor to provide an internet gateway service.

There is further disclosed an example method, further comprising providing instructions to a processor to provide a security agent to implement domain name-based security.

There is further disclosed an example method, further comprising purging cached queries after a time to live (TTL).

There is further disclosed an example method, further comprising providing service or protocol exceptions to the security policy.

There is further disclosed an example method, further comprising characterizing encrypted DNS capabilities of an endpoint source of an outgoing packet.

There is further disclosed an example method, wherein the security policy comprises blocking the outgoing packet if the endpoint has encrypted DNS and auto-configuration capabilities.

There is further disclosed an example method, wherein the security policy comprises providing a captive portal with configuration instructions if the endpoint has encrypted DNS capability but lacks auto-configuration capability.

There is further disclosed an example method, further comprising characterizing encrypted DNS capabilities of an application source of an outgoing packet.

There is further disclosed an example method, wherein the security policy comprises blocking the outgoing packet if the application has encrypted DNS and auto-configuration capabilities.

There is further disclosed an example method, wherein the security policy comprises providing a captive portal with configuration instructions if the application has secure DNS capabilities but lacks auto-configuration capabilities.

There is further disclosed an example home gateway comprising means for performing the method of a number of the above examples.

There is further disclosed an example enterprise gateway comprising means for performing the method of a number of the above examples.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize a gateway or apparatus as illustrated in a number of the above examples.

A system and method of providing policy enforcement for secure domain name services will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In at least some embodiments, security ecosystem 100 may be configured or adapted to provide policy enforcement for secure domain name services, according to the teachings of the present specification.

In the example of FIG. 1, security ecosystem 100 may be an enterprise, a government entity, a data center, a telecommunications provider, a "smart home" with computers, smart phones, and various IoT devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via home network 170. Home network 170 may be any suitable network or combination of one or more networks operating on one or more suitable networking protocols, including a local area network, an intranet, a virtual network, a wide area network, a wireless network, a cellular network, or the internet (optionally accessed via a proxy, virtual machine, or other similar security mechanism) by way of nonlimiting example. Home network 170 may also include one or more servers, firewalls, routers, switches, security appliances, antivirus servers, or other network devices, which may be single-purpose appliances, virtual machines, containers, or functions. Some functions may be provided on client devices 110.

The term "home network" should be understood to refer to the function of the network as a trusted or home-based network. It does not necessarily mean that it is a network for an individual family. Broadly, home network 170 may refer to any network, including an enterprise network, that user 120 regularly connects to, and in particular, a network having a gateway 108 that includes a caching DNS forwarder 114. Caching DNS forwarder 114 may be configured for use in embodiments of the present specification to provide secure DoH or DoT services to home network 170.

In this illustration, home network 170 is shown as a single network for simplicity, but in some embodiments, home network 170 may include any number of networks, such as one or more intranets connected to the internet. Home network 170 may also provide access to an external network, such as the internet, via external network 172. External network 172 may similarly be any suitable type of network.

Home network 170 may connect to the internet via gateway 108, which may be responsible, among other things, for providing a logical boundary between home network 170 and external network 172. Home network 170 may also provide home or enterprise gateway services, and may provide services such as dynamic host configuration protocol (DHCP), router services, and switching services, and may act as a security portal across local boundary 104.

In some embodiments, gateway 108 may be a standalone internet appliance. Such embodiments are popular in cases in which ecosystem 100 includes a home or small business.

In other cases, gateway 108 may run as a virtual machine or in another virtualized manner. In larger enterprises that features service function chaining (SFC) or NFV, gateway 108 may be include one or more service functions and/or VNFs.

Home network 170 may also include a number of discrete IoT devices. For example, home network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Remote DNS 160 may be operated, for example, by the ISP that services home network 170 and provides a connection between home network 170 and external network 172. Remote DNS server 160 may provide comprehensive DNS services, such as maintaining a mirror of a master domain name lookup table that is used to resolve domain names to IP addresses. In some cases, remote DNS 160 may provide encrypted or other privacy enabled DNS services, such as DNS over TLS (DTLS) and/or DNS over HTTPS (DoH).

Privacy enabled DNS services may require a trusted and encrypted connection between client device 110 and remote DNS 160. This can cause problems if caching DNS forwarder 114 is to cache DNS requests and resolve cached domain names to provide increased speed and efficiency for home network 170. Furthermore, caching DNS forwarder 114 may also need to provide certain domain name-based services, such as domain name-based filtering, ACLs, parental controls, and other similar DNS services.

In an encrypted communication, caching DNS forwarder 114 is an intermediary between remote DNS 160 and client device 110. Thus, for caching DNS forwarder 114 to provide its intended functionality, either client device 110 must forego privacy enabled DNS services, or caching DNS forwarder 114 must be configured to act as an authorized intermediary between remote DNS 160 and client device 110. The present specification illustrates a number of devices and methods that provide this intermediary functionality, wherein caching DNS forwarder 114 acts as a broker for managing certificates and credentials between client device 110 and remote DNS 160. In general terms, in an unsecured network, remote DNS 160 and client device 110 can be agnostic of the presence of a caching DNS forwarder 114. In those cases, client device 110 simply issues a domain name lookup request, and that request is serviced either by caching DNS forwarder 114 or by remote DNS 160. Client device 110 does not need to know or care which one services the request, or even that there is a two-tiered DNS structure.

On the other hand, in the case of privacy enabled DNS services, caching DNS forwarder 114 is an active participant in establishing the trusted connection between client device 110 and remote DNS 160. Client device 110 still does not need to know which DNS server ultimately resolves its request, but caching DNS forwarder 114 in this case is an explicit part of the trust chain.

Home network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to home network 170, such as security software, security updates, network appliances, or similar. For example, MCAFEE, LLC provides a comprehensive suite of security services that may be used to protect home network 170 and the various devices connected to it.

It may be a goal of users 120 to successfully operate devices on home network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against home network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects may be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Home network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the GTI database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
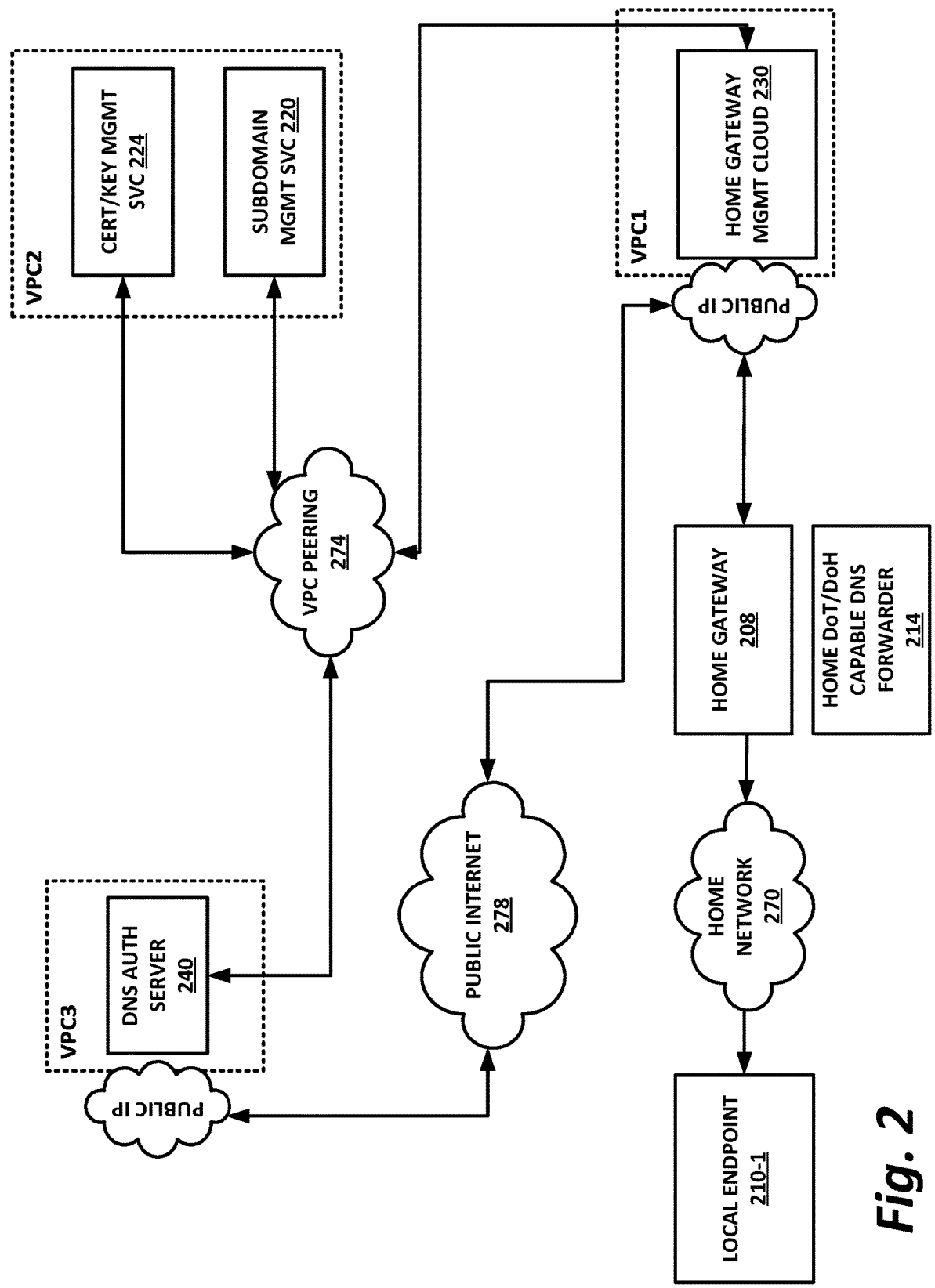
FIG. 2 is a block diagram of further selected aspects of a security ecosystem.

FIG. 2 is a block diagram illustrating further selected aspects of a security ecosystem. In this configuration, a unique subdomain is assigned to each router by the security services provider, which may operate a security services cloud. The subdomains may be of the form:

<unique-router-identifier>.<primary-domain-name>.<top-level-domain>

The primary domain name can be any suitable domain name chosen by the security services provider. In this specification, the domain name "secureDNS.net" will be used as the primary domain name and the top level ".net" domain. This is provided as an illustrative example only, and it is noted that as of the date of this filing, secureDNS.net does not appear to be an active or operative domain name. If that domain name becomes active or operative in the future, there is no intention to imply or require a relationship between that domain name and the present specification.

The unique router identify portion of the FQDN is assigned to the individual router as a unique identifier. This could be, for example, a globally unique identifier (GUID) in the form of an IPv6 address, or other unique identifier. Furthermore, the unique identifier could be user selectable, similar to a username or handle, so that the user can assign a unique or preferred subdomain name to their own individual home router. Any other form of GUID can be used, wherein each router or a group of routers have their own individual GUID to distinguish them from one another.

A service such as ACME may then be used to automate the process of verification and certificate issuance for the subdomain. In an illustrative example, the process of verification and certificate issuance is automated and handled on a cloud service. Once a certificate is issued, it is provisioned to the router using a secure communication channel.

An illustrative architecture is illustrated in FIG. 2. A local endpoint 210-1 communicates via home network 270 with a home gateway 208. Home gateway 208 may include a home DoT/DoH capable DNS forwarder 214 and may have assigned to it, for example by a security services provider, a GUID. This GUID is used to distinguish home gateway 208 from all other home gateways in the networking ecosystem. Home gateway 208 communicates via public internet 278 with a home gateway management cloud 230, which may have a public IP address to make it accessible via public internet 278. Virtual private cloud (VPC) peering 274 may be used to communicatively couple a first VPC (VPC1) that includes home gateway management cloud 230 with a second VPC (VPC2) and a third VPC (VPC3).

VPC2 includes a certificate and key pair management service 224 and a subdomain in DNS management service 220.

VPC3 includes a DNS authoritative server 240.

DNS authoritative server 240 configures and manages DNS records for all domains and their subdomains. Every time a new subdomain is created, a corresponding DNS record (e.g., TXT) may be added to authoritative DNS server 240. (Note that A, AAAA, and PTR records may not be necessary to create the certificate.) Advantageously, if the security services provider operates its own authoritative DNS server, then the security services provider can complete a dns-01 challenge presented by a CA to prove domain ownership during certificate issuance.

Subdomain and DNS management service 220 manages the process of creating a subdomain, adding corresponding DNS records into authoritative DNS server 240, and getting a new domain verified with a certificate for a subdomain. For each subdomain, subdomain management service 220 may use ACME to get a validated domain verified certificate signed by a CA. Subdomain management service 220 may also manage expiry and renewal of certificates.

During this process, subdomain management service 220 may interact with authoritative DNS server 240 to complete the DNS-based (dns-01) domain ownership challenge. It may also interact with certificate and key pair management service 224 for generating a public/private key pair and certificate signing request (CSR). These may be used to sign the ACME negotiations and to securely store the signed certificate. Finally, subdomain management service 220 may also keep track of certificate expiry and handle renewals, as well as handling revocations in case a router subscription expires.

Certificate and key pair management service 224 may be responsible for creating key pairs and CSRs for each subdomain. It may also store key pairs & signed certificates in a secure database.

Home gateway management cloud 230 may be responsible for onboarding new routers, provisioning the subdomain, and providing the key pair and certificate to the router. It may also manage router subscriptions.

It should be noted that the process of creating a new subdomain, configuring its DNS record, and getting a domain validated certificate for that subdomain may take a nontrivial amount of time. For example, the time may be on the order of a few minutes to a few hours. Thus, subdomain management service 220 may optionally maintain a pool of pre-allocated subdomains and corresponding domain validated certificates. These can be used for onboarding new routers, and then be revoked from those routers once provisioning of certificates for those routers is complete. For every new router subscription created on home gateway management cloud 230, home gateway management cloud 230 may request subdomain management service 220 to create a new subdomain and corresponding certificate. Subdomain management service 220 then issues a certificate and the corresponding key pair from the pool of pre-allocated subdomains, and updates the certificate status as provisioned. Home gateway management cloud 230 can then securely provision the certificate and key pair to the router using a secure communication mechanism.

Certain illustrative hardware platforms as discussed below may embody some of the elements described herein. Some of the functions may be provided by software, which may include a secure provisioning algorithm for securely provisioning a certificate to the router. In at least some embodiments, this algorithm may be carried out on more than one device.

By way of illustration of such an algorithm, modern routers often come with a client identity certificate burned into the base firmware by the manufacturer. When a router onboards with home gateway management cloud 230, it may establish a secure sockets layer (SSL) connection with home gateway management cloud 230, wherein it authenticates itself to the management cloud using the identity certificate. Home gateway management cloud 230 may then extract a public key from the client identity certificate received from home gateway 208 and send it to subdomain management service 220. Home gateway management cloud 230 requests from subdomain management service 220 a new domain validated certificate and private key.

Subdomain management service 220 passes the received public key to certificate/key management service 224, and requests a certificate and private key for the subdomain. Certificate and key management service 224 encrypts the private key with the received public key and sends the domain validated certificate, along with an encrypted private key backup, to home gateway management cloud 230 via subdomain management service 220.

Home gateway management cloud 230 may send the encrypted private key and certificate over to home gateway 208, using the secure communication channel established earlier.

The certificate renewal process is similar to that of the certificate issuing, and may also be managed by subdomain management service 220. Subdomain management service 220 may notify home gateway management cloud 230 as soon as the certificate is renewed. Home gateway management cloud 230 then provisions the renewed certificate to home gateway 208 over the secure communication channel, as discussed above.

Finally, the provisioned subdomain and certificate may be used to run a DoT or DoH capable DNS forwarder on the local area network (LAN) interface of home gateway 208. In this configuration, subdomain management service 220 and certificate/key management service 224 may be provided by the security services provider, and thus do not require any infrastructural changes on the part of the ISP network. However, if the ISP network wishes, it can also host and manage a subdomain management service 220 and/or certificate/key management service 224.

Because certificate issuance is handled on the cloud, this mechanism requires shared keys with home gateway 208 over the wire. In general, sharing private keys over the wire is considered suboptimal security practice. However, in this configuration, the wire is secured by SSL, and the key is additionally encrypted by a public key from home gateway 208. Thus, a high level of security is provided even while sharing keys over the wire.

An alternative approach is to run an ACME client on home gateway 208, and then home gateway management cloud 230 may pass the universal unique identifier (UUID) subdomain to home gateway 208. The ACME client then generates the key pair locally on home gateway 208 and interacts with the CA to get a certificate for the subdomain. During this process, the ACME client may interact with an authoritative DNS server 240 on the cloud to fulfill the domain ownership challenges. This approach avoids sharing private keys over the wire, in embodiments where such avoidance is desired.

Figure 3:
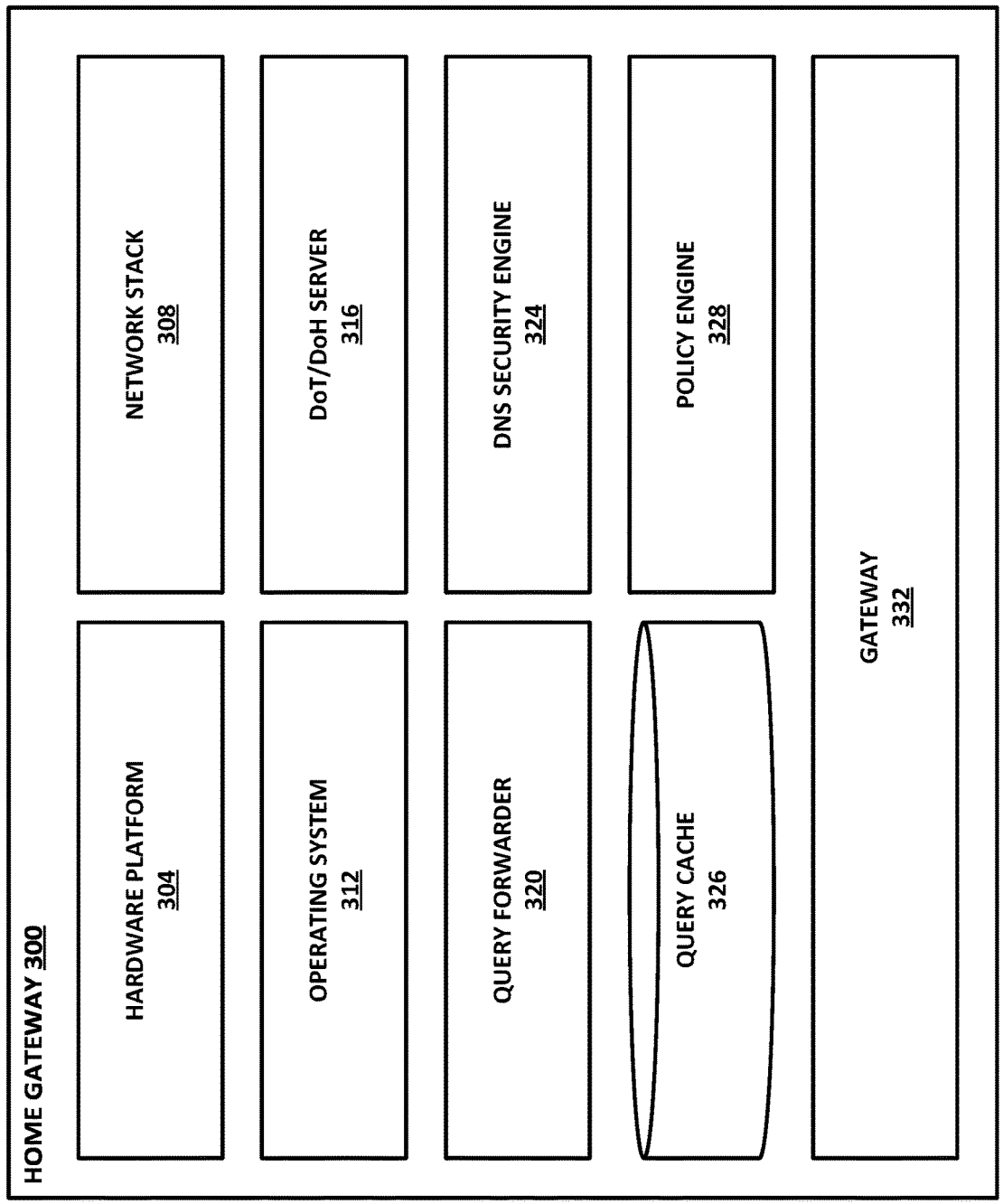
FIG. 3 is a block diagram illustrating elements of a home gateway.

FIG. 3 is a block diagram illustrating elements of a home gateway 300. Home gateway 300 may be configured to provide enhanced security in a DoH/DoT ecosystem. Home gateway 300 of FIG. 3 realizes advantages over certain existing mechanisms and methods. For example, existing methods may detect and block malware abuse of DoH/DoT by acting as a TLS proxy. In some other cases, middle boxes may decide to block list connection attempts to any public resolvers. For instance, some systems may flag a key DoH uniform resource identifier (URI), such as Cloudflare, as high risk or blocked. While the TLS proxy approach works well for some enterprise scenarios, it is more difficult to deploy in consumer home scenarios, and particularly in any enterprise that uses a heterogeneous or mixed device ecosystem, where the enterprise does not have direct control over every device (e.g., BYOD). Furthermore, block listing well-known DoH URIs may also be non-optimal, as this either degrades the DNS privacy and security, or blocks the internet for the user. Advantageously, home gateway 300 provides a lightweight solution that is not required to act as a TLS proxy.

Home gateway 300 addresses the issue of malicious actors finding new ways to bypass security services. For example, new strands of malware have been identified that use DoH to hide the domain and bypass DNS-based detection and filtering solutions residing on the network. These include, for example, PsiXBot and Godlua. To detect and block malware abuse of DoH, home gateway 300 provides a secure or encrypted DNS server, which can include at least one of DoH and/or DoT. A DNS server 316, for example, is deployed on home gateway 300, which may act as a middle box solution. For example, this could run on a secure home platform or an enterprise gateway. The endpoints in the home network, or BYOD devices in the enterprise, can discover the local DoH server using mechanisms described in certain draft standards.

In this example, home gateway 300 is illustrated as a standalone of clients running on a dedicated hardware platform 304. However, it should be understood that home gateway 300 could also be provided in other architectures, including, for example, as a virtual machine or as a container.

Figure 9:
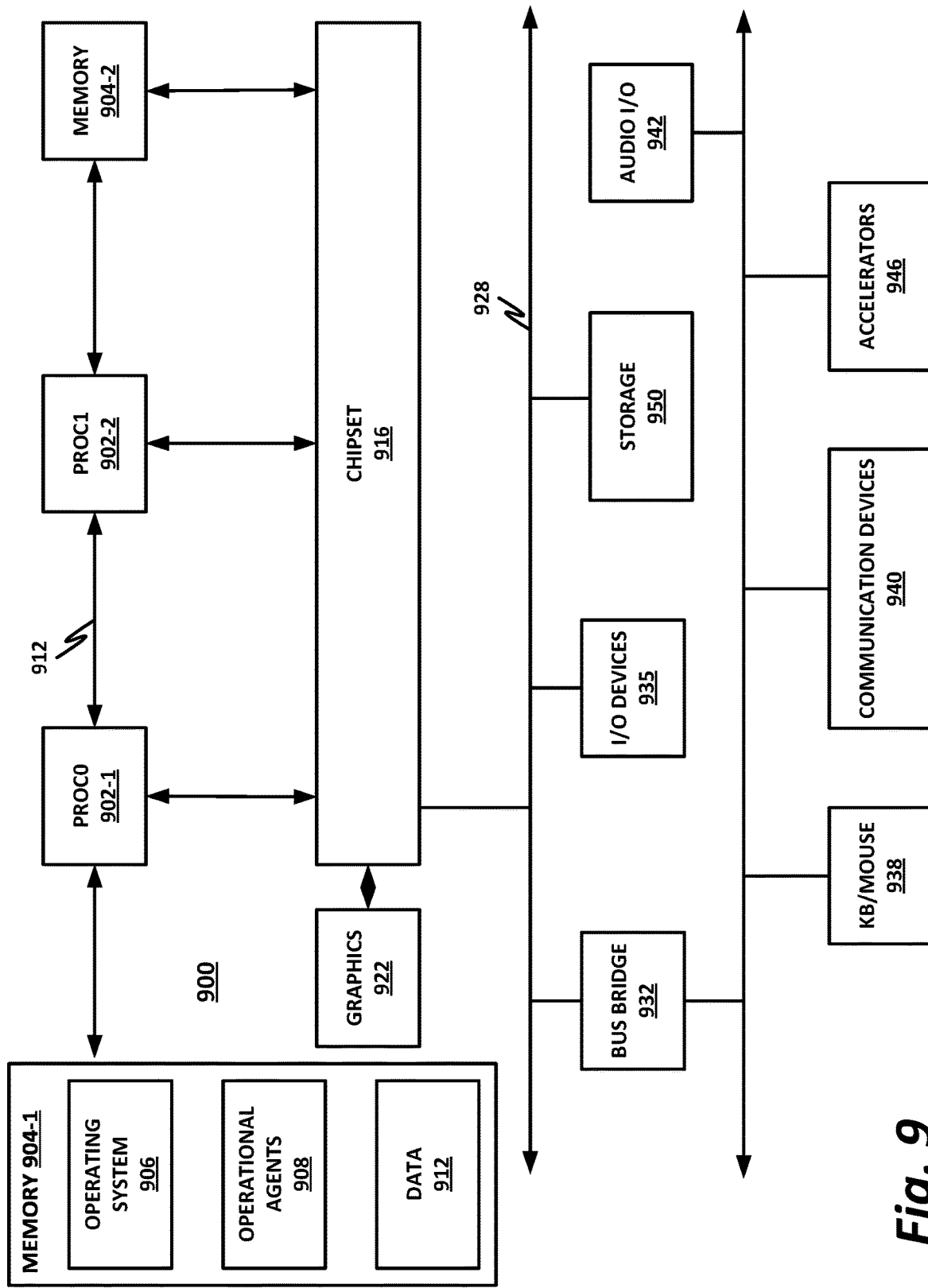
FIG. 9 is a block diagram of selected elements of a hardware platform.

Hardware platform 304 may provide a processor, a memory, a motherboard, and other hardware functions and interfaces for home gateway 300. An illustrative example of a hardware platform is illustrated in FIG. 9 below.

Home gateway 300 also includes a network stack 308. Network stack 308 may provide one or more physical network interfaces, including, for example, a local interface to a LAN, and an outward facing interface, for example, to a wide area network (WAN). Network stack 308 may also provide a traditional seven-layer stack, such as the seven-layer TCP/IP stack, the seven-layer Open Systems Interconnection (OSI) stack, or some other suitable network stack.

Home gateway 300 also includes an operating system 312. Operating system 312 may commonly be an embedded or lightweight operating system, such as a server class Linux operating system. Other operating systems may also be used, such as Microsoft Windows, Macintosh OS X, iOS, Android, or any other suitable operating system.

Home gateway 300 provides a DNS server 316. DNS server 316 may be configured to provide secure DNS services, such as DoT and/or DoH DNS services. This advantageously provides encrypted DNS, which provides greater security and privacy than unencrypted DNS services. However, to interoperate with legacy systems, DNS server 316 could also provide plain-text DNS services, for example on port 53, according to known standards.

DNS server 316 could be an authoritative DNS server, or it could be a caching, forwarding, and/or recursive resolver. For example, DNS server 316 may keep a local cache of recent queries, for example, in query cache 326. Query cache 326 could be, for example, a content-addressable memory (CAM), including a ternary content-addressable memory (TCAM).

In some examples, DNS server 316 may lack authoritative DNS service capabilities to resolve all known domain names. Rather, a query forwarder 320 may be used to forward queries to unknown domain names to an authoritative outside DNS server. When a query is made to a domain name that is not cached in query cache 326, query forwarder 320 may forward the query to an outside authoritative DNS service, receive a result, and then return the result to the querying endpoint or device.

Home gateway 300 may also optionally include a security engine 324. Security engine 324 may operate in part on domain names. For example, security engine 324 may contract with a security services provider, such as security services provider 190 of FIG. 1, to monitor queries to domain names and to determine the reputation of those domain names. For example, MCAFEE, LLC operates Global Threat Intelligence (GTI), which provides global reputations for millions of domain names. However, security agent 324 needs to have visibility into domain name queries. Thus, on a home gateway without DoH, DoT, or other secure or encrypted DNS capability, domain name queries may simply be passed to an outside secure DNS server, and home gateway 300 would have no visibility into the domain name queries for security agent 324 to monitor. Similarly, even though home gateway 300 provides a secure DNS service, if endpoints bypass that secure DNS service, such as by using a separate DNS server, or if applications use their own DNS queries (such as to Cloudflare), then again, home gateway 300 cannot provide its domain name-based security services.

Thus, DNS server 316 may maintain a query cache 326, and may operate a policy engine 328, which can apply policies to DNS queries according to, for example, the capabilities of the devices.

For example, DNS server 316 may identify whether endpoints support DoH and autodiscovery of a local DoH server. To achieve this, home gateway 300 may use a number of techniques. First, home gateway 300 may identify whether the endpoint performed a local DoH discovery. This may be done by one or all of several methods. Home gateway 300 could detect encrypted DNS server requests in dynamic host configuration protocol relay agent (DHCP/RA). It could detect a query for a special use domain. Or, it could observe new DoH sessions between the endpoint and the local DoH server.

Home gateway 300 may then fingerprint an endpoint to identify the running operating system (OS) type and version. From the OS type and version of the endpoint, home gateway 300 can identify whether the endpoint OS supports DoH and autodiscovery of a local DoH server.

Home gateway 300 maintains a locally deployed query cache 326, which includes domains and corresponding IP addresses resolved by each endpoint. This is useful not only for caching recursive resolve operations, but also for providing enhanced security. For each new transmission control protocol (TCP) or user datagram protocol (UDP) session observed, security agent 324 may look into query cache 326 to see if the outgoing IP address has been resolved through local DNS server 316 for that endpoint.

If the destination IP address has been resolved by the endpoint using the locally deployed DNS server 316 (or in other words, the entry was found in the cache mapping), the connection is already filtered through traditional security filters and can be passed through.

On the other hand, if the destination IP address is not found in query cache 326, the attempt to reach the address may be deemed suspicious, and an appropriate security action may be taken according to policy engine 328. This could mean either that DoH to a public DNS server was used, or that some other mechanism was used to resolve the IP address. Thus, the connection is subjected to certain security policies. Examples of security policies are illustrated in FIGS. 5, 6, 7, and 8, below.

Home gateway 300 also includes a gateway engine 332. Gateway engine 332 may also provide additional gateway services, such as routing, switching, DHCP, a firewall, or other gateway or security services.

Figure 4:
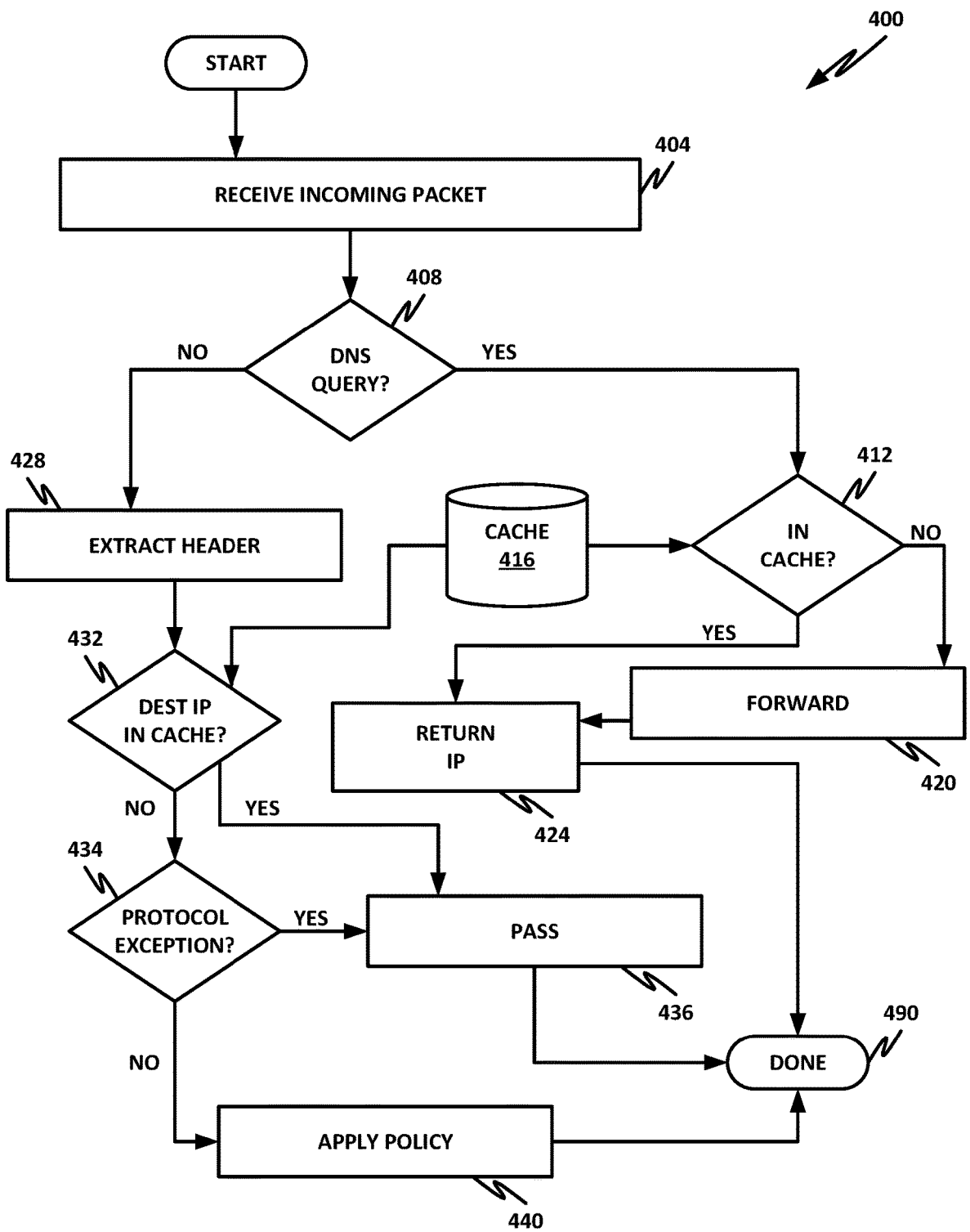
FIG. 4 is a flowchart of a method of providing secure domain name system (DNS) services.

FIG. 4 is a flowchart of a method 400 of providing secure DNS services. Method 400 may be carried out, for example, by a home gateway 300, or by any other suitable device or module.

Starting in block 404, the system receives an incoming packet, such as from an endpoint or client device. This packet may include a header, and is directed to some service or destination.

In decision block 408, the system first determines whether the packet is in fact a DNS query. This could be a plain-text DNS query, or it could be a secure or encrypted DNS query, such as DoH or DoT.

If the packet is a DNS query, then in block 412, if the system is a recursive resolver or caching DNS server, the system may first determine whether the queried domain name is in the cache. If the queried domain name is in cache 416, then in block 424, the system returns the IP address of the domain name.

Returning to decision block 412, if the domain name is not found in cache 416, then in block 420 the system may forward the query to an authoritative DNS server, which is expected to return the appropriate IP address for the queried domain name. This can then be forwarded to the endpoint, and in block 424, the system returns the IP address to the client. In block 490, the method is done.

Returning to decision block 408, if the packet is not a DNS query, then in block 428, the system extracts the header from the packet to inspect various properties.

For example, in block 432, the system may determine whether the destination IP address is found in cache 416. Advantageously, cache 416 could be a CAM or TCAM, which can make such queries very fast.

If the destination IP address is found in the cache, then in block 436, the packet passes inspection. Note that this means it passes inspection only as far as the DoH policies of the present specification are concerned. There may be other security policies, such as the use of domain name-based security systems. However, such security policies are outside the scope of the flowchart of method 400.

In block 490, the method is done.

Returning to decision block 432, if the destination IP is not found in cache 416, then in decision block 434, the system determines whether there is a protocol exception to the IP address. For example, if inspection of the header in block 428 determines that this is a bit torrent, peer-to-peer, filesharing, or other special type of packet, then it is not expected that a DNS query should be used. These protocols may be inferred from the packet header, and when such a protocol is encountered, the DoH/DoT policies of the present specification may not apply in certain embodiments. Thus, if the protocol exception applies, then in block 436, the packet is passed as described above.

Returning to decision block 434, if there is no protocol exception, then the packet is subject to the DoH/DoT policies of the present specification. In particular, because the packet is addressed to an IP address that was not found in cache 416, it is determined that the IP address was not resolved via the system's own secure DNS server. Thus, in block 440, the appropriate policy may be applied to the packet. Examples of such policies are illustrated in FIGS. 5, 6, 7, and 8, and should be understood to be nonlimiting examples of policies that may be applied to such packets.

In block 490, the method is done.

FIGS. 5, 6, 7, and 8 illustrate flowcharts of methods 500, 600, 700, and 800, respectively. These four methods provide some illustrative policies that may be applied dependent on the DoH capabilities of the platform of the client device itself, or of an application that made the DNS request, such as a web browser. Methods 500, 600, 700, and 800 may in some examples all be considered to be subprocesses of block 440 of FIG. 4 ("apply policy").

Figure 5:
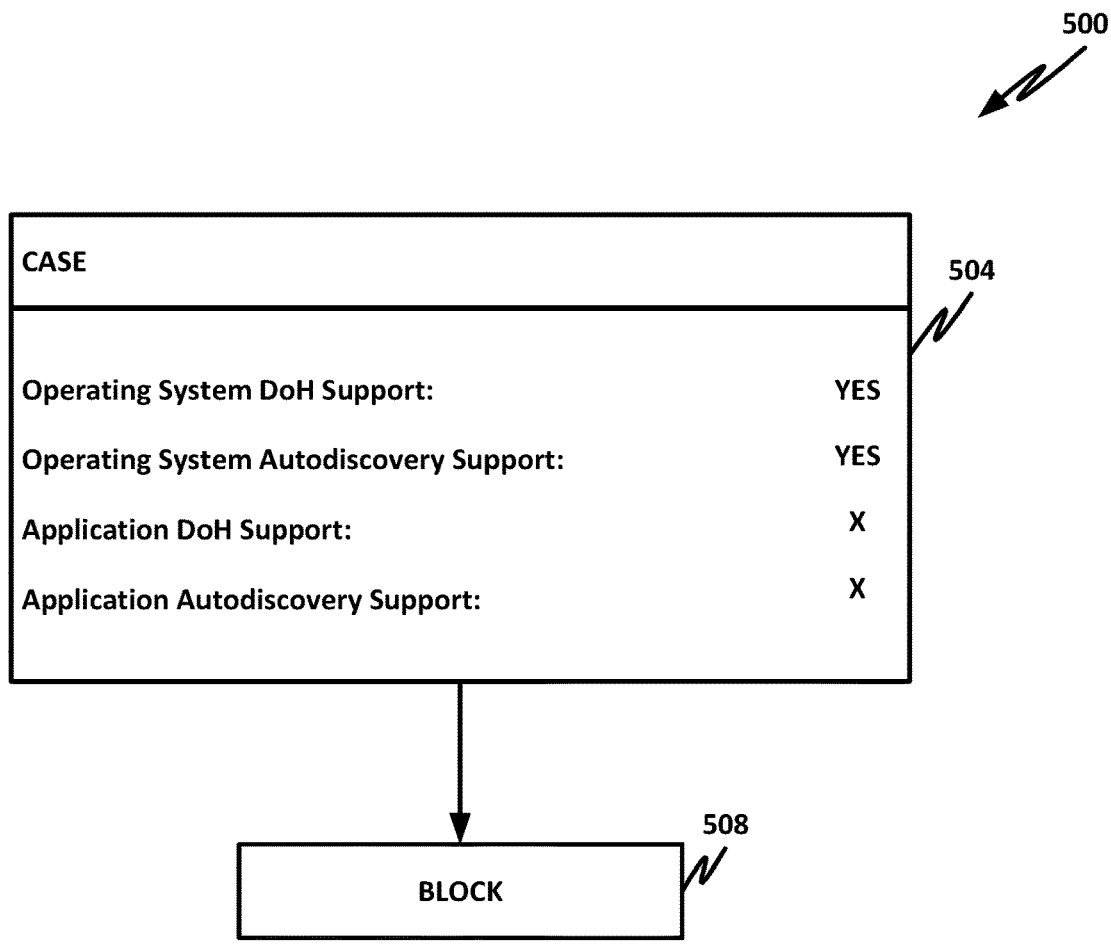
FIG. 5 is a flowchart of a method, according to the teachings of the present specification.

FIG. 5 is a flowchart of a method 500, according to the teachings of the present specification. Method 500 starts with case 504. The cases of each of FIGS. 5, 6, 7, and 8 depend on whether the operating system or platform supports DoH, whether it supports DoH autodiscovery, whether the application providing the query supports DoH, and whether the application supports DoH autodiscovery.

Case 504 is a case where the operating system includes both DoH support and DoH autodiscovery support. In this case, the attributes for whether the application supports DoH and whether the application supports DoH autodiscovery are "don't care" variables.

In this case, the endpoint may have performed an autodiscovery, and a DoH connection was established with the local DoH server by the endpoint. This implies that the OS has discovered and configured the local DoH server as its DoH resolver. It is therefore expected that every application on the endpoint will use the OS-configured, local DoH resolver. Thus, a connection to any IP address not resolved by a local DoH resolver is classified as a malicious connection (e.g., a malware or malicious application trying to bypass network security). Thus, in block 508, the application is blocked.

Note that peer-to-peer applications such as BitTorrent, Web Real-Time Communications (WebRTC) applications such as voice calling, and remote access applications such as secure shell (SSH), Telnet, and similar often do not perform DNS resolution before making a connection to an IP address. Thus, such applications may be covered by a protocol exception 434 of FIG. 4.

In some examples, it should also be noted that OS vendors may provide an API (e.g., getPrivateDnsServerName in Android), for applications to check whether a DoH connection is being used by the OS. If the OS is using a DoH connection, then the applications are required to use the OS-provided DoH connection. Thus, it is reasonable to treat any connections to an address not resolved by the local DoH server as suspicious.

Figure 6:
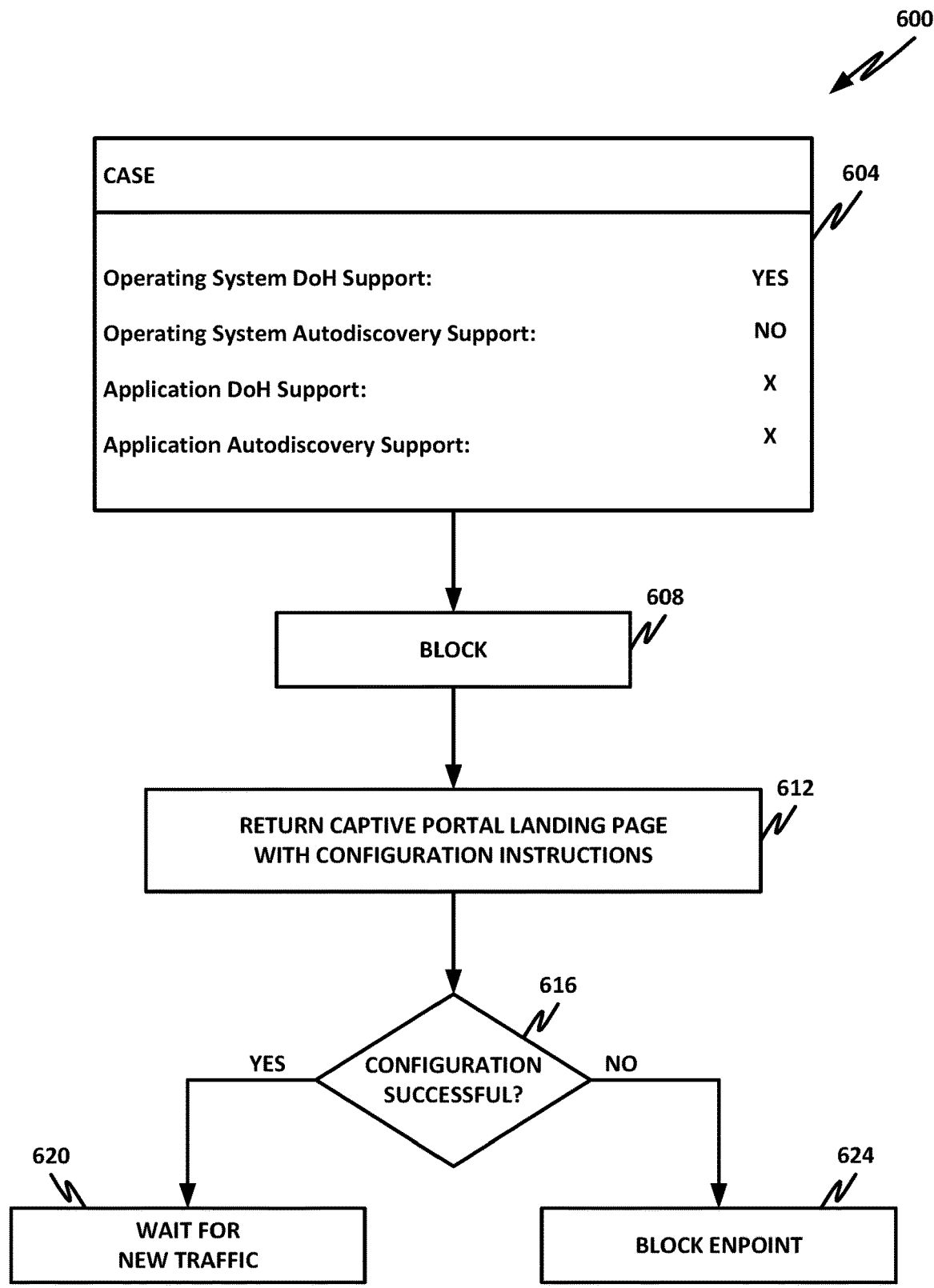
FIG. 6 is a flowchart of a further method, according to the teachings of the present specification.

FIG. 6 is a flowchart of a method 600, according to the teachings of the present specification. Method 600 starts with case 604, wherein the OS provides DoH support, but the OS does not provide autodiscovery support. In this example, the variables for application DoH support and application autodiscovery support are "don't care" variables.

If the installed OS type and version (derived from endpoint fingerprinting) supports DoH but autodiscovery is not supported, then any connection to an IP address that was not resolved by the local server is still blocked, and a captive portal is triggered through which the user can manually configure the local DoH server on the OS stub resolver to be used in the home network. Once the OS stub resolver establishes a DoH session with the local server, the system may proceed as in case 504 of FIG. 5.

Thus, in block 608, the connection is initially blocked.

In block 612, the system returns a captive portal landing page with configuration instructions for how to manually configure the user's local operating system with the appropriate local DoH server.

After the user has been provided with the appropriate DoH configuration, in decision block 616, the system may check to determine whether the configuration was successful.

If the configuration was successful, then in block 620, the system waits for new traffic. When new traffic is received, then a policy may be applied as according to method 500 of FIG. 5.

If the configuration was not successful, then in block 624, the system may block the endpoint until the configuration is successful. In this case, any further attempts to reach the outside network via the gateway will again return the captive portal of block 612. This continues until the user successfully configures the local DoH server on the operating system. Once the DoH server has been successfully configured, then in block 620, new traffic is received, and a policy is applied as per method 500 of FIG. 5.

Using methods 500 of FIG. 5 and 600 of FIG. 6, a local DoH server deployed on the home gateway can successfully detect and block malware or malicious entities trying to hide their malicious activity by using some public DoH server.

In an enterprise set-up, this solution allows for BYOD devices to connect to enterprise networks without having to install a root certificate or mobile device management (MDM) services on them. In cases where the endpoint does not support autodiscovery, the enterprise gateway may force the captive portal until the enterprise DoH resolver is correctly configured on the endpoint. By forcing every DNS query through the enterprise local DoH resolver, the enterprise gateway can apply enterprise-specific DNS filtering policies.

As described above, this solution depends on the ability of endpoints to use DoH and to do autodiscovery on local DoH resolvers. Presently, there is a push in the networking community to get the methods of autodiscovery standardized and adopted. However, in the case of a lag in adoption of DoH and autodiscovery by OS vendors, browsers can start supporting discovery of locally deployed DoH servers and auto-upgrade to use it.

Figure 7:
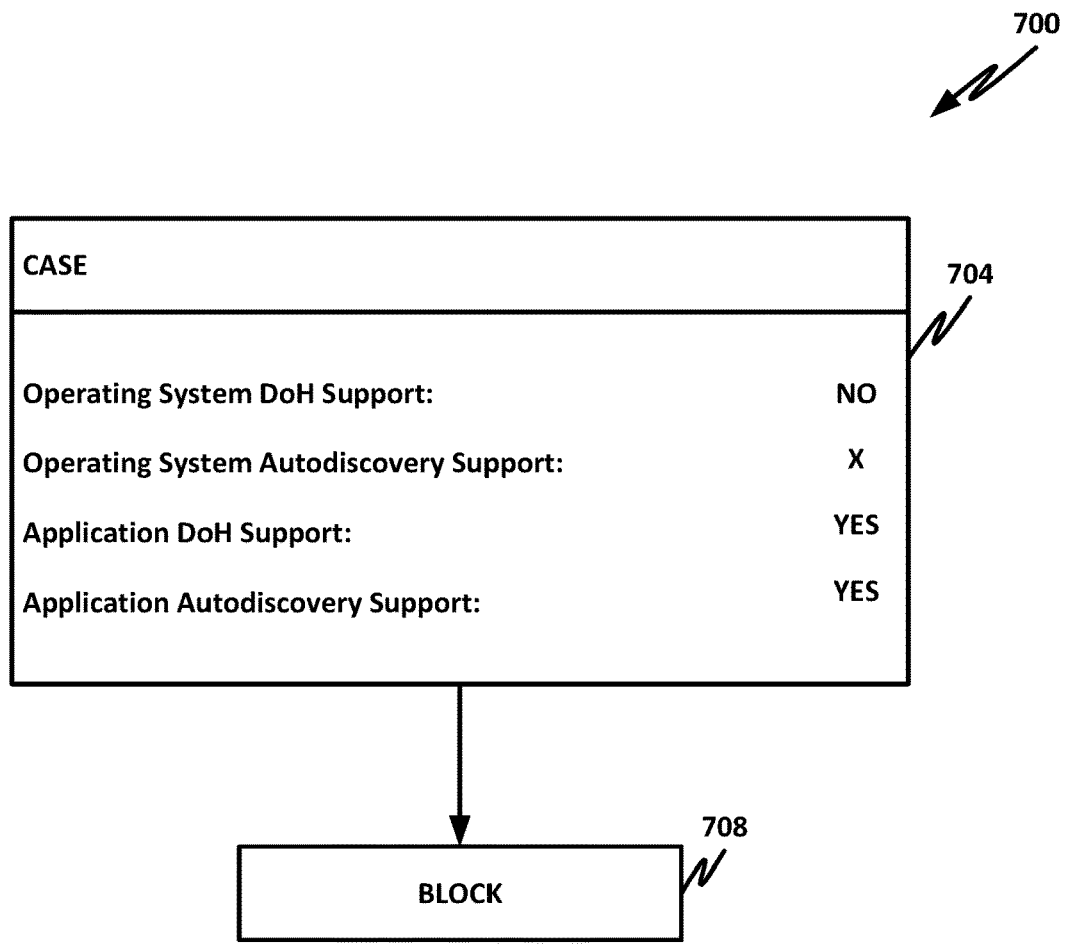
FIG. 7 is a flowchart of an additional method, according to the teachings of the present specification.
Figure 8:
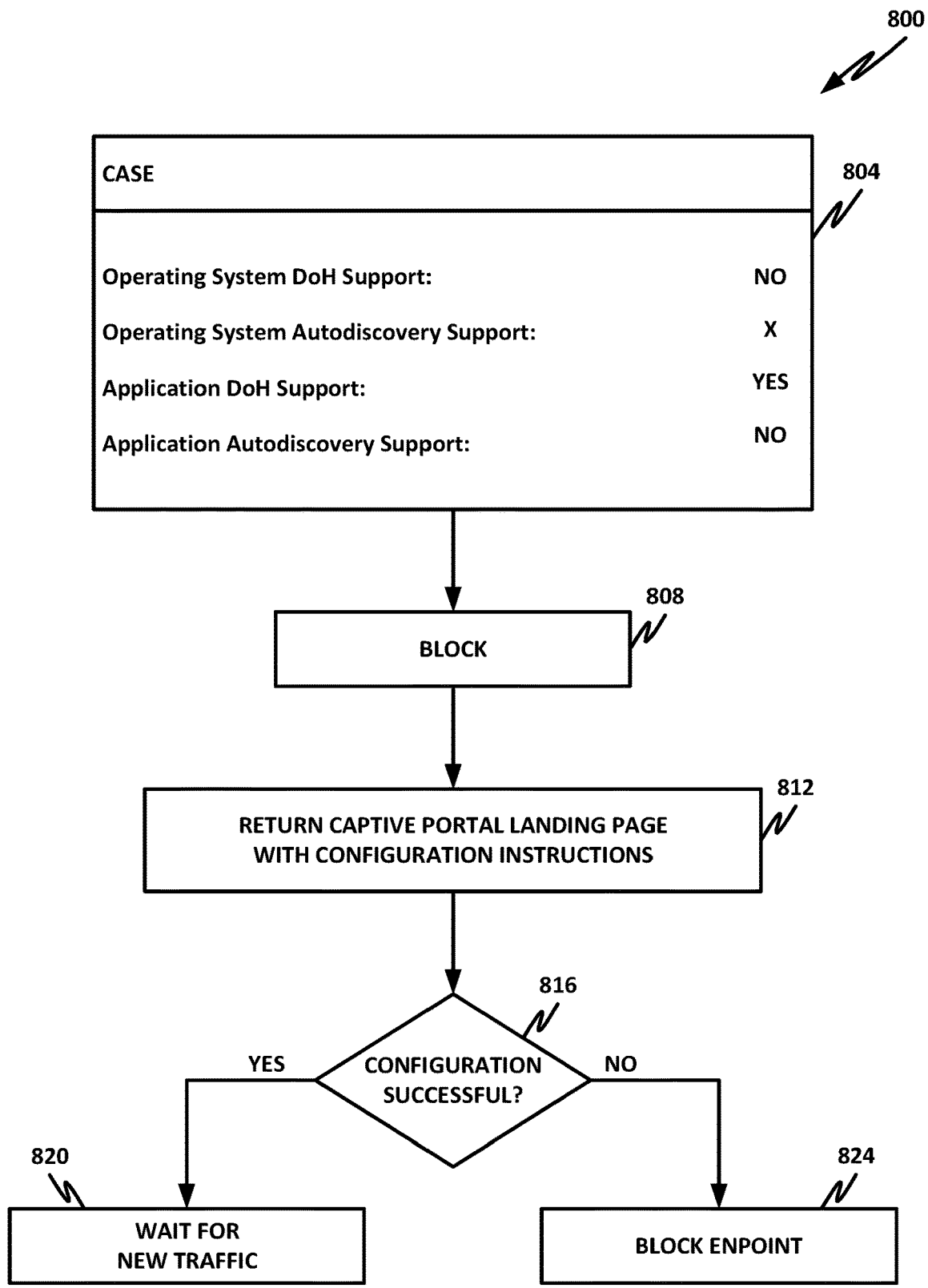
FIG. 8 is a flowchart of a further additional method, according to the teachings of the present specification.

FIGS. 7 and 8 illustrate policies that may be used to extend such capabilities to those scenarios, as well.

Once the middle box, such as the home gateway, fingerprints an endpoint as described above and identifies that the endpoint OS does not support DoH, it can fingerprint the application installed on the endpoint and identify whether the browser installed on the endpoint supports DoH and autodiscovery of the local DoH server. Once the browser or other application is fingerprinted, additional scenarios arise.

FIG. 7 is a flowchart of a method 700, according to the teachings of the present specification. Method 700 starts with case 704, wherein the operating system does not support DoH, and thus autodiscovery is irrelevant. However, in the example of case 704, the application does support DoH, and the application also supports autodiscovery.

If an operating system installed on the endpoint does not support DoH, and the browser does support DoH and autodiscovery of the local server, any traffic to an IP address not resolved via the local DoH server may be blocked according to policy. This is because, in this scenario, the IP address is not resolved via the local DoH server, which may signify that the applications are using some other public DoH server to resolve the IP address. This may be against policy, or may indicate malicious intent on the part of the application. Thus, the policy may block such connections.

Therefore, in block 708, the connection is blocked. Such connections will continue to be blocked as long as the application is attempting to reach IP addresses that are not in the local DoH query cache.

FIG. 8 is a flowchart of a method 800, according to the teachings of the present specification. Method 800 starts with case 804, wherein the operating system does not support DoH, and thus operating system-level DoH autodiscovery is irrelevant. In this case, the application does provide DoH support, but does not provide DoH autodiscovery.

If the OS installed on the endpoint does not support DoH, and the browser or other application supports DoH but not autodiscovery, the browser may be redirected to a captive portal page for manual configuration of the local DoH server on the browser. This is similar to the case of method 600 of FIG. 6. The captive portal is maintained until the browser or other application is correctly configured to use the local DoH server.

Thus, in block 808, the connection is initially blocked.

In block 812, the system returns a captive portal landing page with configuration instructions for how to manually configure the user's application with the appropriate local DoH server.

After the user has been provided with the appropriate DoH configuration, in decision block 816, the system may check to determine whether the configuration was successful.

If the configuration was successful, then in block 820, the system waits for new traffic. When new traffic is received, then a policy may be applied as according to method 500 of FIG. 5.

If the configuration was not successful, then in block 824, the system may block the endpoint until the configuration is successful. In this case, any further attempts to reach the outside network via the gateway will again return the captive portal of block 812. This continues until the user successfully configures the local DoH server on the operating system. Once the DoH server has been successfully configured, then in block 820, new traffic is received, and a policy is applied as per method 500 of FIG. 5.

Using methods 500 of FIG. 5 and 600 of FIG. 6, a local DoH server deployed on the home gateway can successfully detect and block malware or malicious entities trying to hide their malicious activity by using some public DoH server.

The methods described above, particularly in FIGS. 4-8, may help to detect and block the abuse of DoH or DoT by malicious entities. Advantageously, this provides a very lightweight solution that can be easily employed on both home and enterprise networks without having the need for middle boxes to act as TLS proxies.

FIG. 9 is a block diagram of a hardware platform 900. In at least some embodiments, hardware platform 900 may be programmed, configured, or otherwise adapted to provide policy enforcement for secure domain name services, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 900, even though they may be scattered across a data center, or even located in different data centers.

Hardware platform 900 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high-performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, IP telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 900 is arranged in a point-to-point (PtP) configuration. This PtP configuration is popular for personal computer (PC) and server-type devices, although it is not so limited, and any other bus type may be used.

Hardware platform 900 is an example of a platform that may be used to implement embodiments of the teachings of this specification. For example, instructions could be stored in storage 950. Instructions could also be transmitted to the hardware platform in an ethereal form, such as via a network interface, or retrieved from another source via any suitable interconnect. Once received (from any source), the instructions may be loaded into memory 904, and may then be executed by one or more processor 902 to provide elements such as an operating system 906, operational agents 908, or data 912.

Hardware platform 900 may include several processors 902. For simplicity and clarity, only processors PROC0 902-1 and PROC1 902-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 902 may be any type of processor and may communicatively couple to chipset 916 via, for example, PtP interfaces. Chipset 916 may also exchange data with other elements, such as a high-performance graphics adapter 922. In alternative embodiments, any or all of the PtP links illustrated in FIG. 9 could be implemented as any type of bus, or other configuration rather than a PtP link. In various embodiments, chipset 916 may reside on the same die or package as a processor 902 or on one or more different dies or packages. Each chipset may support any suitable number of processors 902. A chipset 916 (which may be a chipset, uncore, Northbridge, Southbridge, or other suitable logic and circuitry) may also include one or more controllers to couple other components to one or more central processor units (CPUs).

Two memories, 904-1 and 904-2 are shown, connected to PROC0 902-1 and PROC1 902-2, respectively. As an example, each processor is shown connected to its memory in a direct memory access (DMA) configuration, though other memory architectures are possible, including ones in which memory 904 communicates with a processor 902 via a bus. For example, some memories may be connected via a system bus, or in a data center, memory may be accessible in a remote DMA (RDMA) configuration.

Memory 904 may include any form of volatile or non-volatile memory including, without limitation, magnetic media (e.g., one or more tape drives), optical media, flash, random-access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 904 may be used for short, medium, and/or long-term storage. Memory 904 may store any suitable data or information utilized by platform logic. In some embodiments, memory 904 may also comprise storage for instructions that may be executed by the cores of processors 902 or other processing elements (e.g., logic resident on chipsets 916) to provide functionality.

In certain embodiments, memory 904 may comprise a relatively low-latency volatile main memory, while storage 950 may comprise a relatively higher-latency non-volatile memory. However, memory 904 and storage 950 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 904 and storage 950, for example, in a single physical memory device, and in other cases, memory 904 and/or storage 950 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 922 may be configured to provide a human-readable visual output, such as a command-line interface (CLI) or graphical desktop such as Microsoft Windows, Apple OSX desktop, or a Unix/Linux X Window System-based desktop. Graphics adapter 922 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 922 may include a hardware graphics card, which may have its own memory and its own graphics processing unit (GPU).

Chipset 916 may be in communication with a bus 928 via an interface circuit. Bus 928 may have one or more devices that communicate over it, such as a bus bridge 932, I/O devices 935, accelerators 946, communication devices 940, and a keyboard and/or mouse 938, by way of nonlimiting example. In general terms, the elements of hardware platform 900 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 940 can broadly include any communication not covered by a network interface and the various I/O devices described herein. This may include, for example, various universal serial bus (USB), FireWire, Lightning, or other serial or parallel devices that provide communications.

I/O Devices 935 may be configured to interface with any auxiliary device that connects to hardware platform 900 but that is not necessarily a part of the core architecture of hardware platform 900. A peripheral may be operable to provide extended functionality to hardware platform 900, and may or may not be wholly dependent on hardware platform 900. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 942 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 932 may be in communication with other devices such as a keyboard/mouse 938 (or other input devices such as a touch screen, trackball, etc.), communication devices 940 (such as modems, network interface devices, peripheral interfaces such as PCI or PCIe, or other types of communication devices that may communicate through a network), audio I/O 942, and/or accelerators 946. In alternative embodiments, any portions of the bus architectures could be implemented with one or more PtP links.

Operating system 906 may be, for example, Microsoft Windows, Linux, UNIX, Mac OS X, iOS, MS-DOS, or an embedded or real-time operating system (including embedded or real-time flavors of the foregoing). In some embodiments, a hardware platform 900 may function as a host platform for one or more guest systems that invoke application (e.g., operational agents 908).

Operational agents 908 may include one or more computing engines that may include one or more non-transitory computer-readable mediums having stored thereon executable instructions operable to instruct a processor to provide operational functions. At an appropriate time, such as upon booting hardware platform 900 or upon a command from operating system 906 or a user or security administrator, a processor 902 may retrieve a copy of the operational agent (or software portions thereof) from storage 950 and load it into memory 904. Processor 902 may then iteratively execute the instructions of operational agents 908 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 900 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a LAN, metropolitan area network (MAN), WAN, wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 900 may be virtualized, in particular the processor(s) and memory. For example, a virtualized environment may run on OS 906, or OS 906 could be replaced with a hypervisor or virtual machine manager. In this configuration, a virtual machine running on hardware platform 900 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 9 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 10. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 10:
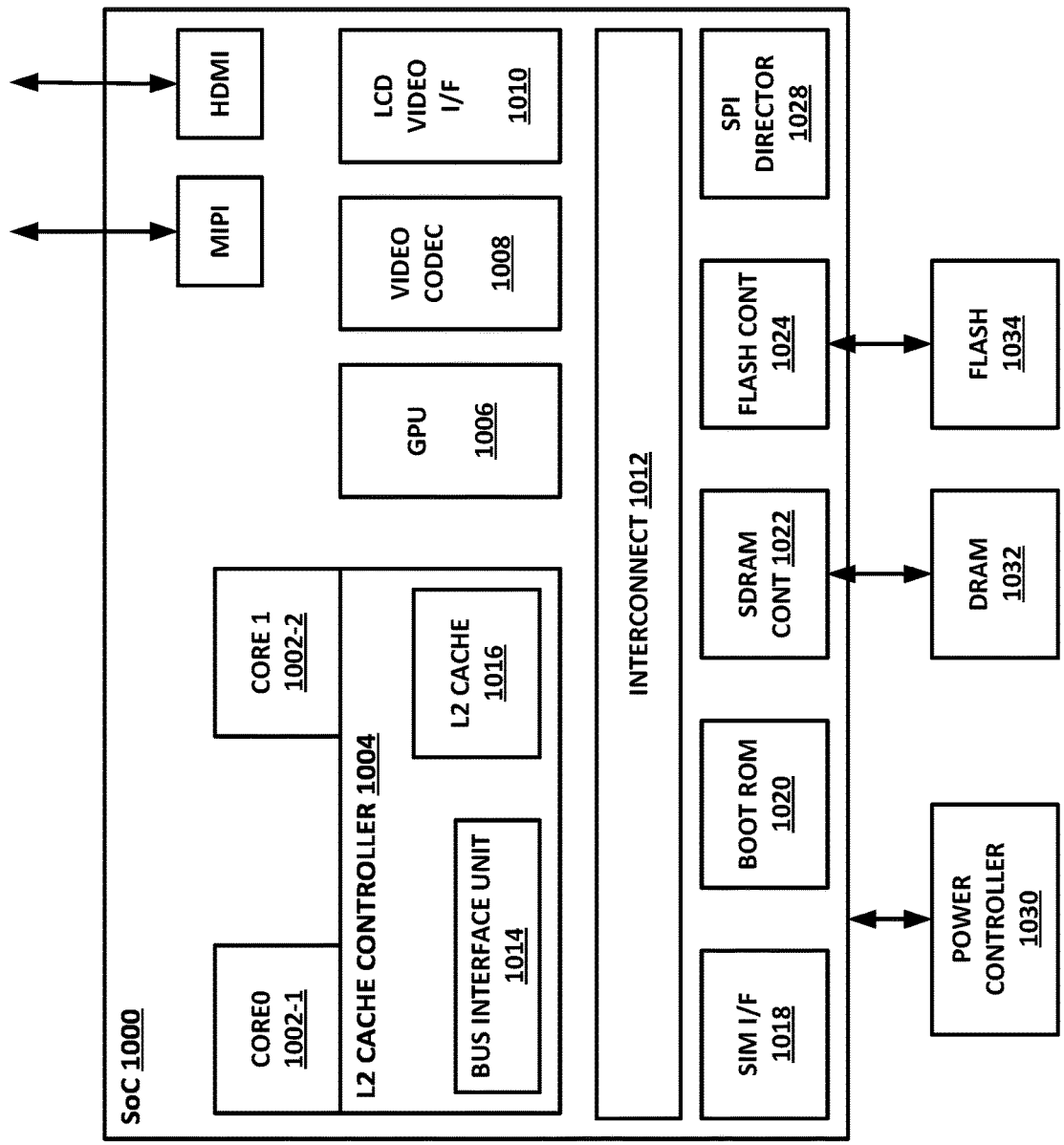
FIG. 10 is a block diagram of selected elements of a system-on-a-chip (SoC).

FIG. 10 is a block illustrating selected elements of an example SoC 1000. In at least some embodiments, SoC 1000 may be programmed, configured, or otherwise adapted to provide policy enforcement for secure domain name services, according to the teachings of the present specification.

At least some of the teachings of the present specification may be embodied on an SoC 1000, or may be paired with an SoC 1000. SoC 1000 may include, or may be paired with, an advanced reduced instruction set computer machine (ARM) component. For example, SoC 1000 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 1000 could also be integrated into, for example, a PC, server, video processing components, laptop computer, notebook computer, netbook, or touch-enabled device.

As with hardware platform 900 above, SoC 1000 may include multiple cores 1002-1 and 1002-2. In this illustrative example, SoC 1000 also includes an L2 cache control 1004, a GPU 1006, a video codec 1008, a liquid crystal display (LCD) I/F 1010 and an interconnect 1012. L2 cache control 1004 can include a bus interface unit 1014, a L2 cache 1016. Liquid crystal display (LCD) I/F 1010 may be associated with mobile industry processor interface (MIPI)/HDMI links that couple to an LCD.

SoC 1000 may also include a subscriber identity module (SIM) I/F 1018, a boot ROM 1020, a synchronous dynamic random-access memory (SDRAM) controller 1022, a flash controller 1024, a serial peripheral interface (SPI) director 1028, a suitable power control 1030, a dynamic RAM (DRAM) 1032, and flash 1034. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 1000 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a non-volatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

Figure 11:
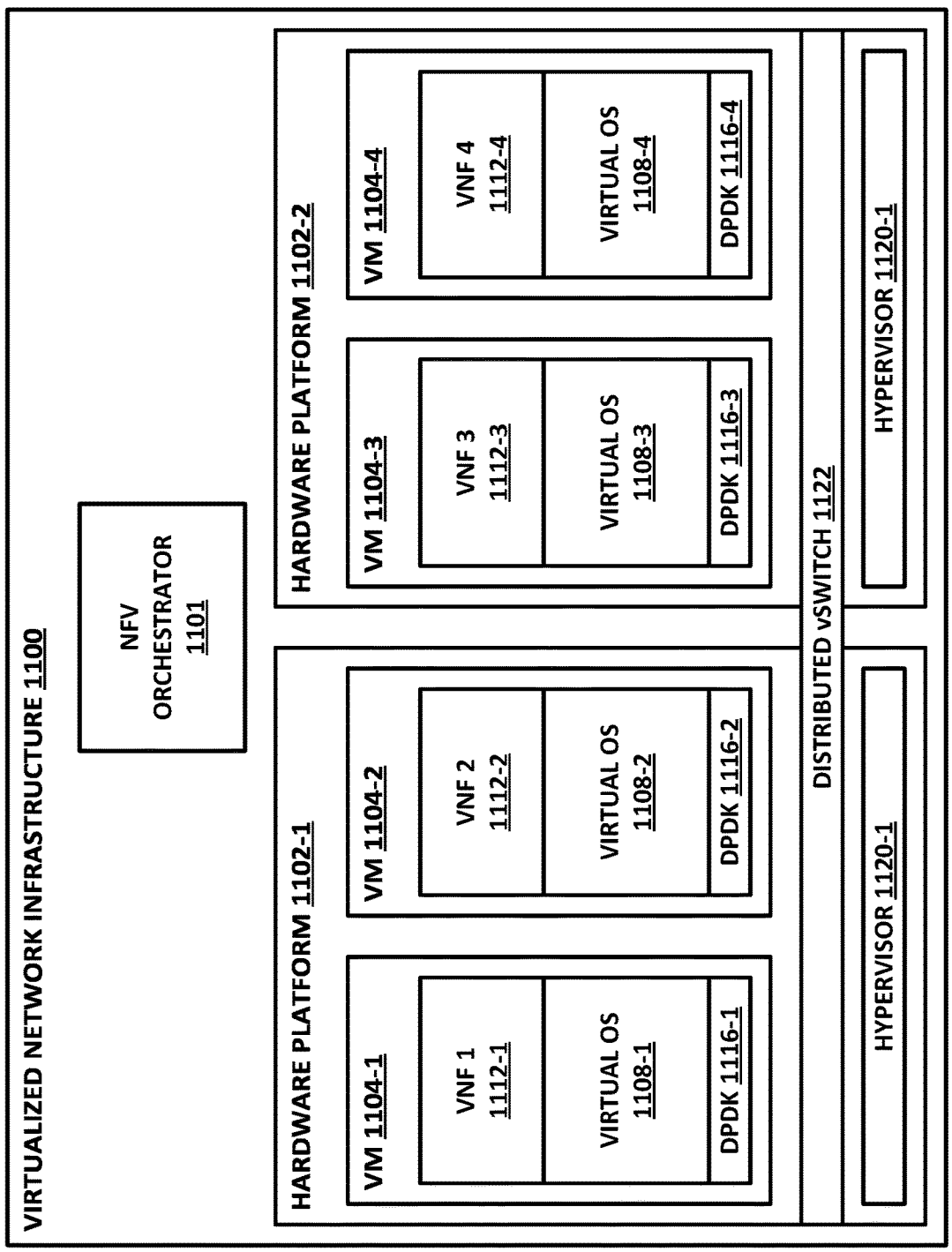
FIG. 11 is a block diagram of selected elements of a network function virtualization (NFV) infrastructure.

FIG. 11 is a block diagram of a network function virtualization (NFV) infrastructure 1100. FIG. 11 illustrates a platform for providing virtualization services. Virtualization may be used in some embodiments to provide one or more features of the present disclosure.

NFV is an aspect of network virtualization that is generally considered distinct from, but that can still interoperate with, software defined networking (SDN). For example, VNFs may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1100. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 manages a number of the VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, virtual machine manager (VMM), or similar function, which may include and run on a native (bare metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMs 1104, each of which in this example is a VNF providing a virtual service appliance. Each VM 1104 in this example includes an instance of the Data Plane Development Kit (DPDK), a virtual operating system 1108, and an application providing the VNF 1112.

VNFs could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100. This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., an HFI). This HFI may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

Figure 12:
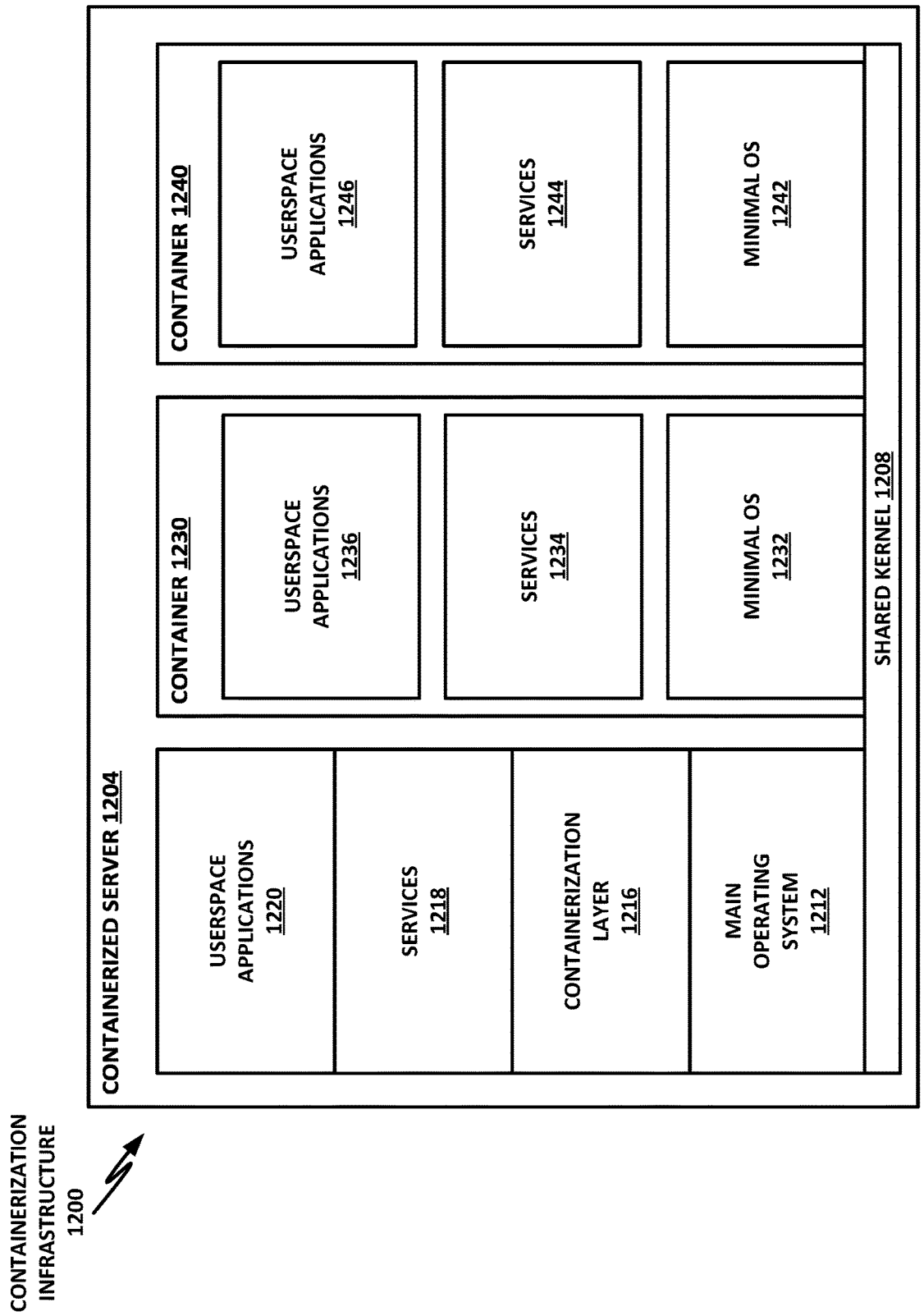
FIG. 12 is a block diagram of selected elements of a containerization infrastructure.

FIG. 12 is a block diagram of selected elements of a containerization infrastructure 1200. FIG. 12 illustrates a platform for providing containerization services. Containerization may be used in some embodiments to provide one or more features of the present disclosure. Like virtualization, containerization is a popular form of providing a guest infrastructure.

Containerization infrastructure 1200 runs on a hardware platform such as containerized server 1204. Containerized server 1204 may provide a number of processors, memory, one or more network interfaces, accelerators, and/or other hardware resources.

Running on containerized server 1204 is a shared kernel 1208. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1208 is main operating system 1212. Commonly, main operating system 1212 is a Unix or Linux-based operating system, although containerization infrastructure is also available for other types of systems, including Microsoft Windows systems and Macintosh systems. Running on top of main operating system 1212 is a containerization layer 1216. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 1212 may also include a number of services 1218, which provide services and interprocess communication to userspace applications 1220.

Services 1218 and userspace applications 1220 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1212, they inherit the same file and resource access permissions as those provided by shared kernel 1208. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1204, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 1204).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 1204 hosts two containers, namely container 1230 and container 1240.

Container 1230 may include a minimal operating system 1232 that runs on top of shared kernel 1208. Note that a minimal operating system is provided as an illustrative example, and is not mandatory. In fact, container 1230 may perform as full an operating system as is necessary or desirable. Minimal operating system 1232 is used here as an example simply to illustrate that in common practice, the minimal operating system necessary to support the function of the container (which in common practice, is a single or monolithic function) is provided.

On top of minimal operating system 1232, container 1230 may provide one or more services 1234. Finally, on top of services 1234, container 1230 may also provide a number of userspace applications 1236, as necessary.

Container 1240 may include a minimal operating system 1242 that runs on top of shared kernel 1208. Note that a minimal operating system is provided as an illustrative example, and is not mandatory. In fact, container 1240 may perform as full an operating system as is necessary or desirable. Minimal operating system 1242 is used here as an example simply to illustrate that in common practice, the minimal operating system necessary to support the function of the container (which in common practice, is a single or monolithic function) is provided.

On top of minimal operating system 1242, container 1240 may provide one or more services 1244. Finally, on top of services 1244, container 1240 may also provide a number of userspace applications 1246, as necessary.

Using containerization layer 1216, containerized server 1204 may run a number of discrete containers, each one providing the minimal operating system and/or services necessary to provide a particular function. For example, containerized server 1204 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), non-volatile random-access memory (NVRAM), NVM (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A gateway apparatus, comprising:
    a hardware platform comprising a processor and a memory; and
    instructions stored within the memory to instruct the processor to:
        provide a domain name system (DNS) server, the DNS server to provide an encrypted DNS service, and to cache resolved domain names;
        receive an outgoing network packet;
        determine a destination address of the outgoing network packet
        characterize encrypted DNS capabilities of an endpoint source of the outgoing network packet; and
        upon determining that the destination address was not cached, apply a security policy based on the encrypted DNS capabilities of the endpoint source.

2. The gateway apparatus of claim 1, wherein the DNS server is a caching or forwarding server.

3. The gateway apparatus of claim 1, wherein the DNS server is an authoritative server.

4. The gateway apparatus of claim 1, wherein the DNS server is further to provide plain-text DNS services.

5. The gateway apparatus of claim 1, wherein the instructions are further to provide an internet gateway service.

6. The gateway apparatus of claim 1, wherein the instructions are further to provide a security agent to provide domain name-based security.

7. The gateway apparatus of claim 1, wherein the instructions are further to purge cached queries after a time to live (TTL).

8. The gateway apparatus of claim 1, wherein the instructions are to provide service or protocol exceptions to the security policy.

9. The gateway apparatus of claim 1, wherein the security policy comprises blocking the outgoing network packet if the endpoint source has encrypted DNS and auto-configuration capabilities.

10. The gateway apparatus of claim 1, wherein the security policy comprises providing a captive portal with configuration instructions if the endpoint source has encrypted DNS capability but lacks auto-configuration capability.

11. The gateway apparatus of claim 1, wherein the instructions are further to characterize encrypted DNS capabilities of an application source of the outgoing network packet.

12. The gateway apparatus of claim 11, wherein the security policy comprises blocking the outgoing network packet if the application source has encrypted DNS and auto-configuration capabilities.

13. The gateway apparatus of claim 11, wherein the security policy comprises providing a captive portal with configuration instructions if the application source has secure DNS capabilities but lacks auto-configuration capabilities.

14. One or more tangible, non-transitory computer-readable storage media having stored thereon executable instructions to:
    provision a domain name system (DNS) query cache;
    provide a secure DNS server, the secure DNS server to provide at least one of DNS over hypertext transfer protocol secure (DoH) or DNS over transport layer security (DoT), and to cache addresses of resolved domain names with a time to live (TTL);
    provide domain name-based security services; and
    apply a security policy to an outgoing packet after determining that a destination address of the outgoing packet is not in the DNS query cache, wherein the security policy is based on an encrypted DNS capability of an endpoint source or application source of the outgoing packet.

15. The one or more tangible, non-transitory computer-readable storage media of claim 14, wherein the DNS query cache comprises a content-addressable memory (CAM) or ternary CAM (TCAM).

16. The one or more tangible, non-transitory computer-readable storage media of claim 14, wherein the security policy comprises blocking the outgoing packet if the endpoint source or application source has encrypted DNS and auto-configuration capabilities.

17. A computer-implemented method of providing domain name-based network security, comprising:
    receiving domain name system (DNS) queries, including DNS over hypertext transfer protocol secure (DoH) or DNS over transport layer security (DoT) queries;
    recursively resolving the queries;
    caching resolved addresses for the queries;
    receiving outbound network traffic;
    checking a destination of the outbound network traffic against the cached resolved addresses;
    characterizing encrypted DNS capabilities of a source endpoint that provided the outbound network traffic; and
    if the destination is not found in the cached resolved addresses, applying a security policy to the outbound network traffic, wherein the security policy is based on the encrypted DNS capabilities of the source endpoint.

18. The method of claim 17, wherein the security policy comprises blocking the outbound network traffic if the source endpoint has encrypted DNS and auto-configuration capabilities.

19. The method of claim 17, wherein the security policy comprises blocking the outbound network traffic if the source endpoint has encrypted DNS and auto-configuration capabilities.

20. The method of claim 17, further comprising characterizing encrypted DNS capabilities of an application source of the outbound network traffic, and adjusting the security policy based on the encrypted DNS capabilities of the application source.

* * * * *